US012187575B2

(12) United States Patent
Deppisch et al.

(10) Patent No.: US 12,187,575 B2
(45) Date of Patent: Jan. 7, 2025

(54) PROCESSING MACHINE AND METHOD FOR ALIGNING A SUBSTRATE IN A PROCESSING MACHINE

(71) Applicant: KOENIG & BAUER AG, Würzburg (DE)

(72) Inventors: Bastian Deppisch, Karlstadt (DE); Torsten Müller, Güntersleben (DE); Bernd Masuch, Kürnach (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/695,025

(22) PCT Filed: Jan. 20, 2023

(86) PCT No.: PCT/EP2023/051326
§ 371 (c)(1),
(2) Date: Mar. 25, 2024

(87) PCT Pub. No.: WO2023/148013
PCT Pub. Date: Aug. 10, 2023

(65) Prior Publication Data

US 2024/0336449 A1 Oct. 10, 2024

(30) Foreign Application Priority Data

Feb. 4, 2022 (DE) ..................... 10 2022 102 707.4

(51) Int. Cl.
*B65H 9/00* (2006.01)
*B41F 5/24* (2006.01)
(Continued)

(52) U.S. Cl.
CPC ............... *B65H 9/002* (2013.01); *B41F 5/24* (2013.01); *B41F 13/56* (2013.01); *B41F 21/00* (2013.01);
(Continued)

(58) Field of Classification Search
CPC .. B41F 5/24; B41F 13/56; B41F 21/00; B41F 33/00; B65H 9/00; B65H 9/002;
(Continued)

(56) References Cited

U.S. PATENT DOCUMENTS 5,383,392 A 1/1995 Kowalewski et al.
5,564,693 A * 10/1996 Elkis .................... B65H 29/242 198/689.1
(Continued)

FOREIGN PATENT DOCUMENTS

DE 69406962 T2 4/1998
DE 102018201918 A1 8/2019
(Continued)

OTHER PUBLICATIONS

International Search Report of PCT/EP2023/051326 dated Apr. 21, 2023.

*Primary Examiner* — Thomas A Morrison
(74) *Attorney, Agent, or Firm* — MATTINGLY & MALUR, PC

(57) ABSTRACT

A processing machine includes at least one processing unit configured as at least one shaping unit following, in a transport direction of a substrate, at least one processing unit configured as at least one application unit. Additionally, at least one transport unit is arranged between the at least one application unit and at least one succeeding processing unit. The at least one transport unit includes a plurality of transport elements that are arranged one behind the other in the transport direction. At least one transport element is axially adjustable based on detection of at least one image-producing element of a substrate by at least one sensor for substrate alignment.

15 Claims, 13 Drawing Sheets

(51) Int. Cl.

| | |
|---|---|
| ***B41F 13/56*** | (2006.01) |
| ***B41F 21/00*** | (2006.01) |
| ***B41F 33/00*** | (2006.01) |
| ***B65H 9/20*** | (2006.01) |

(52) U.S. Cl.

CPC ............... *B41F 33/00* (2013.01); *B65H 9/20* (2013.01); *B65H 2301/331* (2013.01); *B65H 2404/1523* (2013.01); *B65H 2404/16* (2013.01); *B65H 2406/31* (2013.01); *B65H 2553/41* (2013.01); *B65H 2701/1311* (2013.01)

(58) Field of Classification Search

CPC ................ B65H 9/20; B65H 2301/331; B65H 2404/1523; B65H 2404/16; B65H 2406/31; B65H 2553/41; B65H 2701/1311

See application file for complete search history.

(56) References Cited

U.S. PATENT DOCUMENTS

| | | | | |
|---|---|---|---|---|
| 6,209,866 | B1 * | 4/2001 | Hosking ................ | G07D 11/17<br>271/227 |
| 2008/0111297 | A1 * | 5/2008 | Fujita ..................... | B65H 9/002<br>271/227 |

FOREIGN PATENT DOCUMENTS

| | | | |
|---|---|---|---|
| DE | 102018204314 | A1 | 9/2019 |
| DE | 102019110853 | A1 | 10/2020 |
| DE | 102019119372 | A | 1/2021 |
| WO | 2016174221 | A1 | 11/2016 |

* cited by examiner

PROCESSING MACHINE AND METHOD FOR ALIGNING A SUBSTRATE IN A PROCESSING MACHINE

CROSS-REFERENCES TO RELATED APPLICATIONS

This application is the US national phase, under 35 USC § 371, of PCT/EP2023/051326, filed on Jan. 20, 2023, published as WO 2023/148013 A1 on Aug. 10, 2023, and claiming priority to DE 10 2022 102 707.4, filed Feb. 4, 2022, and all of which are expressly incorporated by reference herein in their entireties.

TECHNICAL FIELD

Examples herein relate to a processing machine and to a method for aligning a substrate in a processing machine. For instance, the processing machine may include at least one processing unit configured as a shaping unit following at least one processing unit configured as an application unit in a transport direction of a substrate. At least one transport unit is arranged between the at least one processing unit configured as the application unit and the at least one succeeding processing unit. The at least one transport unit includes a plurality of transport elements. The transport elements of the plurality of transport elements are arranged one behind the other in the transport direction.

Additionally, the method for aligning a substrate may be performed with a processing machine including at least one processing unit configured as a shaping unit following at least one processing unit configured as an application unit in a transport direction of a substrate. At least one transport unit is arranged between the at least one processing unit configured as the application unit and the at least one succeeding processing unit. The at least one transport unit includes a plurality of transport elements and the transport elements of the plurality of transport elements are arranged one behind the other in the transport direction.

BACKGROUND

Various processing units are used in processing machines, in particular for sheets such as corrugated cardboard sheets. Printing fluid is applied to the sheets by means of at least one application unit and, additionally or alternatively, the mass and/or shape and/or contour of the sheets are modified by way of at least one shaping device. Flexographic printing is one possible application method. Flexographic printing is characterized by a plate cylinder including a flexible printing plate. A die cutter, in particular a rotary die cutter, is usually a possible shaping device. To ensure a high quality of the end product, it is necessary to align the substrate in the processing machine true to register.

The alignment of the substrate is typically carried out in the equipment of the processing machine, that is, before the first processing unit. For example, EP 2 456 698 B1 shows such a processing machine comprising a feeder arranged before the first processing unit. The feeder comprises a lateral driving device for the movement in the lateral direction as well as two longitudinal driving devices for the movement in the longitudinal direction.

DE 10 2019 110 853 A1 discloses a sheet processing machine comprising a shaping device for processing sheets and at least one separation device for removing at least one offcut piece of at least one sheet. At least one inspection device for at least partially inspecting at least one remaining portion of the at least one sheet processed by the shaping device, comprising at least one multiple-up, is arranged in the transport direction of the sheets downstream from the separation device.

WO 98/18053 A1 discloses an alignment device for a sheet in a single-sheet printer. A transport device of the alignment device can be moved transversely to the transport direction so as to arrange a lateral edge of the sheet at the level of a rated printing position.

DE 20 2012 100 708 U1 shows a die-cutting device comprising a feed unit feeding a material sheet to the die-cutting cylinder and a control system synchronizing the movements of the material sheet and of the die-cutting cylinder. A detection device detecting the position of the material sheet is provided, wherein the control system is configured so as to control the speed of the feed unit based on the signals of the detection device.

In particular due to the substrate being processed by the processing units, or also due to the substrate being transported by transport means, the positioning thereof in relation to an ideal alignment can change along the transport path through the processing machine, in particular after at least one first processing unit.

A processing machine is known from DE 10 2019 119 372 A1, wherein at least one sheet sensor arranged upstream from the application unit is assigned to the application unit, the sheet sensor detecting the arrival time of sheets at the position of the sheet sensor to compensate for color registration errors in the transport direction. However, it is not possible to compensate for errors of the color register in the transverse direction, that is, during a lateral displacement of the sheet, and/or to compensate for errors of the color register due to a skewed position of the sheet.

WO 2016/174221 A1 teaches a machine system comprising several processing stations for processing sheets, wherein at least one of these processing stations is embodied as a non-impact printing device. An alignment device is arranged in the transport direction of the sheets between the non-impact printing device and a processing station arranged downstream from the non-impact printing device, wherein this alignment device aligns each of the sheets, at least in terms of their axial register and/or in terms of their circumferential register, true to register relative to a processing position of the processing station arranged downstream from the non-impact printing device.

DE 10 2018 201 918 A1 discloses a sheet processing machine comprising coating units and a shaping unit comprising a die-cutting cylinder. A transport unit is arranged between the coating units and the shaping unit, wherein the transport path of sheets can be located beneath the transport surface. The sheet to be processed is aligned in an infeed device before the coating unit. The circumferential register, lateral register and/or diagonal register are determined by detecting register marks by means of sensors and subsequent evaluation. Depending on the evaluation, the relative positions of cylinders of the processing units are adjusted.

DE 10 2018 204 314 A1 teaches a sheet processing machine comprising coating units and a shaping unit comprising a die-cutting cylinder. A transport unit is arranged between the coating units and the shaping unit, wherein the transport path of sheets can be located beneath the transport surface. The sheet to be processed is aligned in an infeed device before the coating unit. The infeed device comprises an alignment roller, which can be moved in part or as a whole in the transverse direction. In the area of the alignment roller, the sheet to be processed is transported lying flat.

DE 694 06 962 T2 discloses a device for successively passing individual corrugated cardboard sheets through a flexographic printing section and a die-cutting section. For this purpose, a transfer section comprising a driven conveyor is arranged between the flexographic printing section and the die-cutting section. A sensor means for sensing a sheet is provided in the transfer section. The positional registration of the sheet is adjusted by accelerating and retarding the conveyor from the line speed, and subsequently returning it to the line speed.

SUMMARY

It is an object of some examples herein to provide a processing machine and a method for aligning a substrate in a processing machine.

The object is achieved according to some examples by the above described processing machine and method. For instance, the processing machine discussed above may include at least one transport element of the plurality of transport elements that is axially adjustable based on the detection of at least one image-producing element of the substrate by at least one sensor for substrate alignment. Further, the method may include that at least one transport element of the plurality of transport elements is axially adjusted based on a detection of at least one image-producing element of a substrate by at least one sensor for substrate alignment.

A processing machine is created. The processing machine comprises at least one processing unit. The processing machine comprises at least two processing units, which carry out processing operations that differ from one another. At least one processing unit, for example a forward processing unit, is designed as an application unit. At least one processing unit, a succeeding processing unit, is designed as a shaping unit. At least one processing unit, designed as a shaping unit, preferably as a die-cutting unit, or alternatively as an application unit, follows at least one processing unit designed as an application unit in the transport direction of substrate, preferably without further processing units being interposed. In particular, at least one further processing unit follows a first processing unit. The succeeding processing unit is designed as a shaping unit, and more preferably as a die-cutting unit.

At least one transport unit is arranged before at least one processing unit succeeding the transport unit in the transport direction of substrate. The at least one processing unit follows, preferably immediately follows, the at least one transport unit, more preferably without further processing units being interposed. The succeeding processing unit is designed as a shaping unit, and more preferably as a die-cutting unit. The at least one transport unit is arranged between the at least one processing unit designed as an application unit and the at least one succeeding processing unit, which is designed as a shaping unit, preferably as a die-cutting unit. Preferably, a section, defined by the transport unit, of the transport path provided for a transport of substrate is located beneath a transport surface of the transport unit. In this way, a hanging transport of substrate advantageously follows. The at least one transport unit comprises at least one transport element. In particular, the at least one transport unit comprises a plurality of transport elements, preferably at least two transport elements. The at least one transport element of the plurality of transport elements is axially adjustable. The at least one transport element of the plurality of transport elements is axially adjustable based on the detection of at least one image-producing element, preferably at least one printing mark, of a substrate by at least one sensor for substrate alignment. Advantageously, this allows a substrate to be optimally aligned relative to the processing unit processing the same.

A method for aligning a substrate in a processing machine is created. In particular, the substrate is aligned relative to a processing unit of the processing machine. In the transport direction of substrate, at least one processing unit of the processing machine follows at least one transport unit of the processing machine, preferably without further processing units being interposed. At least one processing unit designed as a shaping unit, preferably as a die-cutting unit, or alternatively as an application unit, follows at least one processing unit designed as an application unit in the transport direction of substrate. The at least one transport unit is arranged between the at least one processing unit designed as an application unit and the at least one succeeding processing unit, which is designed as a shaping unit, preferably as a die-cutting unit. Preferably, a section, defined by the at least one transport unit, of the transport path provided for a transport of substrate is located beneath a transport surface of the transport unit. Advantageously, in this way a hanging transport of substrate takes place, preferably at least by way of the at least one transport unit for substrate alignment. The at least one transport unit comprises at least one transport element. In particular, the at least one transport unit comprises a plurality of transport elements, preferably at least two transport elements. The at least one transport element of the plurality of transport elements is axially adjusted. At least one sensor for substrate alignment detects at least one image-producing element of the substrate. The at least one transport element of the plurality of transport elements is axially adjusted based on the detection of at least one image-producing element, preferably at least one printing mark. The at least one sensor for substrate alignment preferably controls by closed loop and/or open loop the at least one dedicated drive for the axial adjustment of the at least one transport element.

The at least one transport unit preferably comprises a plurality of transport elements. The at least one transport unit, which is preferably designed to align substrate, thus preferably comprises at least two, preferably at least three, more preferably at least four, more preferably at least five, transport elements. For example, the at least one transport unit comprises no more than twenty, preferably no more than twelve, more preferably no more than eleven, transport elements. The transport elements of the plurality of transport elements are arranged one behind the other in the transport direction. The plurality of transport elements are preferably individually axially adjustable or groupwise axially adjustable. The plurality of transport elements are preferably individually axially adjusted or, as an alternative, the plurality of transport elements are groupwise axially adjusted.

In a preferred embodiment, the at least one transport unit, and in particular the at least one transport unit for substrate alignment, is designed as a suction transport means designed as a suction box, also referred to as a roller suction system. Advantageously, different substrates, in particular with respect to the thickness thereof, can thus be processed and precisely aligned. The design as a suction box preferably allows a differentiated adjustment of the individual transport elements, without adversely affecting the retaining force holding the substrate. Advantageously, secure substrate guidance and substrate alignment are made possible, without damaging the substrate, for example, by an engaging holding means. In particular, simple substrate guidance and substrate alignment are made possible during a hanging transport of the substrate.

The at least one transport element preferably comprises a dedicated drive for the axial adjustment. The at least one transport unit preferably comprises the at least one transport element and at least one further transport element, arranged after and/or before the same in the transport direction, which each comprise a dedicated drive for the axial adjustment. In other words, at least one further transport element is arranged after the at least one transport element and/or at least one further transport element is arranged before the at least one transport element, which each comprise a dedicated drive for the axial adjustment. These transport elements are thus preferably each axially adjustable. These at least two transport elements preferably each comprise a dedicated drive for the axial adjustment. Advantageously, the at least one dedicated drive allows an individual adjustment of the transport elements in a simple manner, and thus an individual adaptation, depending on the necessary alignment of the substrate.

The at least one transport unit preferably comprises at least one main drive, which is designed so as to generate a rotative movement of the at least one transport element. The plurality of transport elements are preferably coupled to the at least one main drive. Preferably, at least one sensor for recognizing a leading edge of substrate is connected to the at least one main drive by means of at least one control unit.

Advantageously, the substrate is aligned in a substrate feed device by means of at least one fixed or movable stop. Advantageously, the alignment of the substrate by means of the at least one transport unit is carried out in addition to the alignment in the substrate feed device.

Advantageously, at least one sensor, preferably for recognizing the leading edge of the substrate, is arranged upstream from the at least one processing unit, and preferably each processing unit. Preferably, the arrival time of a region of the substrate to be processed and the arrival time of a processing tool of the processing unit at a processing point are adjusted and/or can be adjusted relative to one another, based on this at least one sensor. This sensor is advantageously space-saving, in particular, for example, with respect to image acquisition devices.

Advantageously, the processing machine comprises at least one inspection device, preferably at least one printed image monitoring system and/or at least one color register monitoring system and/or at least one die-cutting monitoring system. The at least one inspection device is preferably connected to at least one drive of the processing machine and/or to at least one sheet diverter for channeling out substrate and/or at least one further component of the processing machine. Preferably, the at least one drive of the processing machine and/or the at least one sheet diverter for channeling out substrate and/or the at least one further component of the processing machine are controlled by open loop and/or closed loop, based on the monitoring of the substrate by the at least one inspection device. The at least one inspection device is preferably connected by means of at least one control unit to the at least one dedicated drive and/or to the at least one main drive of the at least one transport unit. Advantageously, the inspection results are thus taken into consideration in the activation of the at least one transport unit.

Advantageously, an alignment is carried out between two processing units so as to adjust and/or readjust the alignment of the substrate after at least one first processing operation. The accuracy of the alignment of the substrate is advantageously increased while the processing operation is ongoing. Advantageously, the accuracy of the processing operation is thus increased. In this way, the quality of the produced product is advantageously increased. Advantageously, in addition the productivity of the processing machine is increased. Advantageously, the substrate guidance is simplified.

Advantageously, a misregistration of a substrate is corrected while this substrate is arranged at at one transport unit, preferably while being transported by means of the at least one transport unit. Advantageously, the substrate is aligned at the at least one transport unit in the transport direction and/or in the transverse direction and/or with respect to a skewed position.

At least one plate cylinder of a processing unit of the processing units preferably comprises at least one drive for axially adjusting the plate cylinder. More preferably, at least one plate cylinder of the succeeding processing unit, which is preferably designed as a die-cutting unit or as an application unit, preferably comprises at least one drive for axially adjusting the plate cylinder. The plate cylinder preferably additionally comprises at least one drive in the circumferential direction. Advantageously, the relative position of the at least one plate cylinder relative to a substrate to be processed is optimized. Preferably, at least one plate cylinder of at least one processing unit of the processing units is axially adjusted and/or can be axially adjusted by means of at least one drive for axially adjusting the plate cylinder. More preferably, at least one plate cylinder of the succeeding processing unit preferably is axially adjusted and/or can be axially adjusted by means of at least one drive for axially adjusting the plate cylinder. Advantageously, an optimal adaptation of the color register is made possible by correctly positioning the plate cylinder in the axial position thereof and/or relative to a master axis value. Preferably, the at least one processing unit, preferably the at least one application unit and/or the at least one shaping unit, more preferably each processing unit, in particular an application unit and/or a processing unit succeeding an application unit, comprises at least one drive for axially adjusting the at least one plate cylinder of the processing unit. Preferably, the at least one processing unit, preferably the at least one application unit and/or the at least one shaping unit, more preferably each processing unit, in particular an application unit and/or a processing unit succeeding an application unit, comprises at least one drive in the circumferential direction of the at least one plate cylinder of the processing unit. Advantageously, an adjustment of the plate cylinder of the processing unit in the axial direction and/or in the circumferential direction, preferably the rotational speed thereof, and/or an adjustment for compensating for a skewed position of the plate cylinder are made possible.

An alignment of the substrate is advantageously made possible after the substrate has passed through at least one application unit. Advantageously, an alignment of the substrate is carried out, preferably in addition to an alignment in a first unit of the processing machine which, for example, is designed as a substrate feed device, in particular before the at least one shaping unit. In particular, a high accuracy of the processing operation of the substrate is thus achieved by the at least one shaping unit, for example of at least one die-cutting contour, relative to the processing operation of the substrate by the at least one application unit, for example at least one print image.

BRIEF DESCRIPTION OF THE DRAWINGS

Further advantages are apparent from the following description of the drawings. Exemplary embodiments of the invention are illustrated in the drawings and will be described in greater detail below. The drawings show.

DETAILED DESCRIPTION

Figure 1:
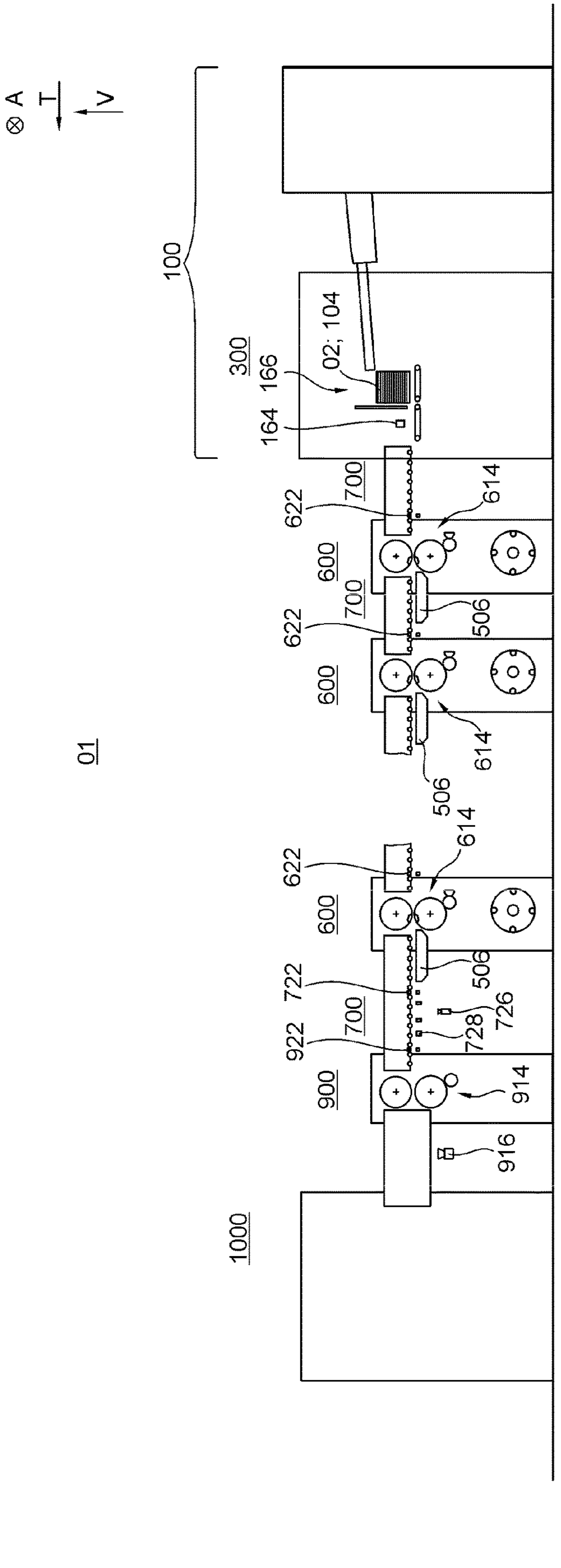
FIG. 1 a schematic representation of a processing machine.
Figure 2:
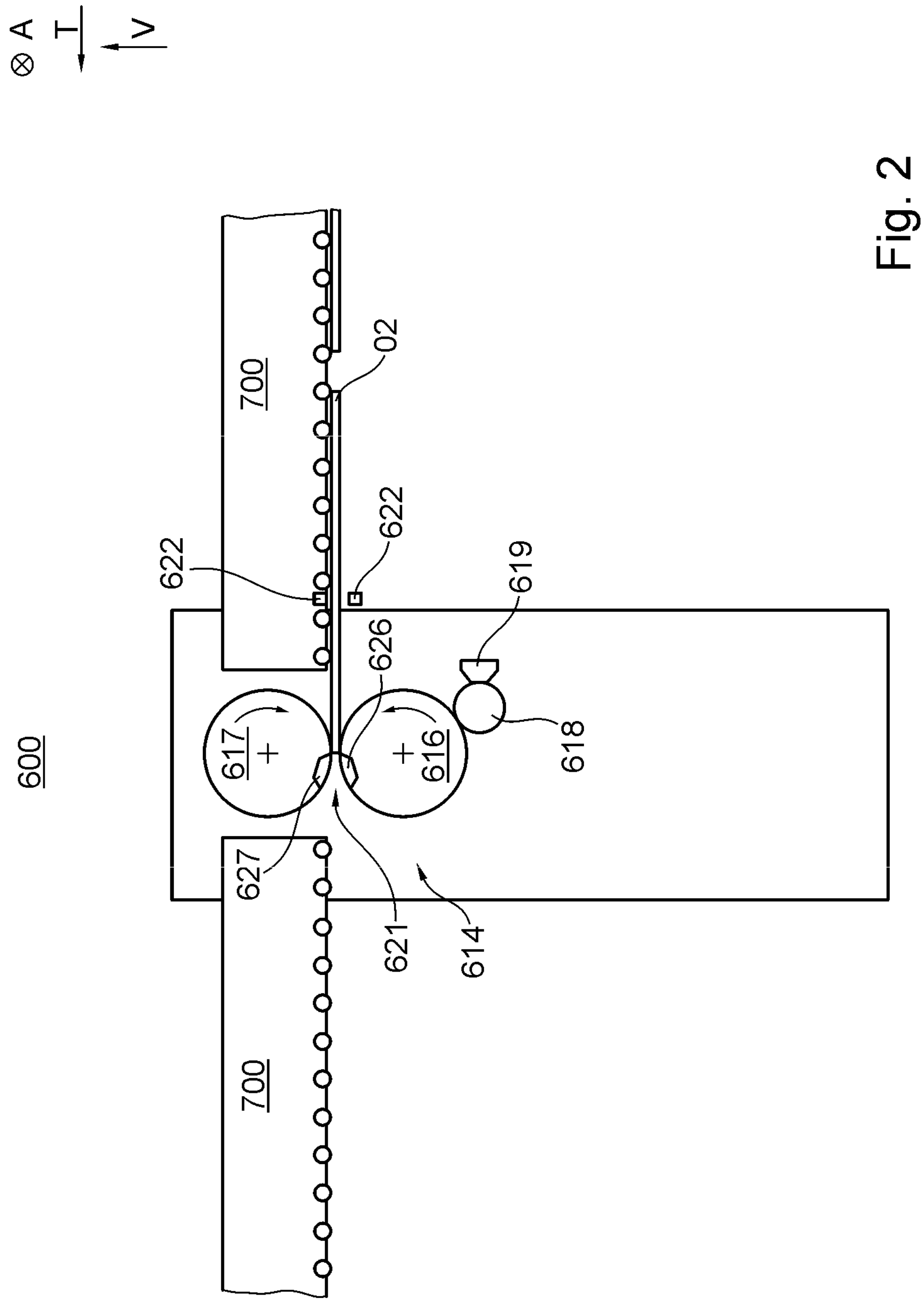
FIG. 2 a schematic representation of an application unit comprising at least one upstream sensor.
Figure 3:
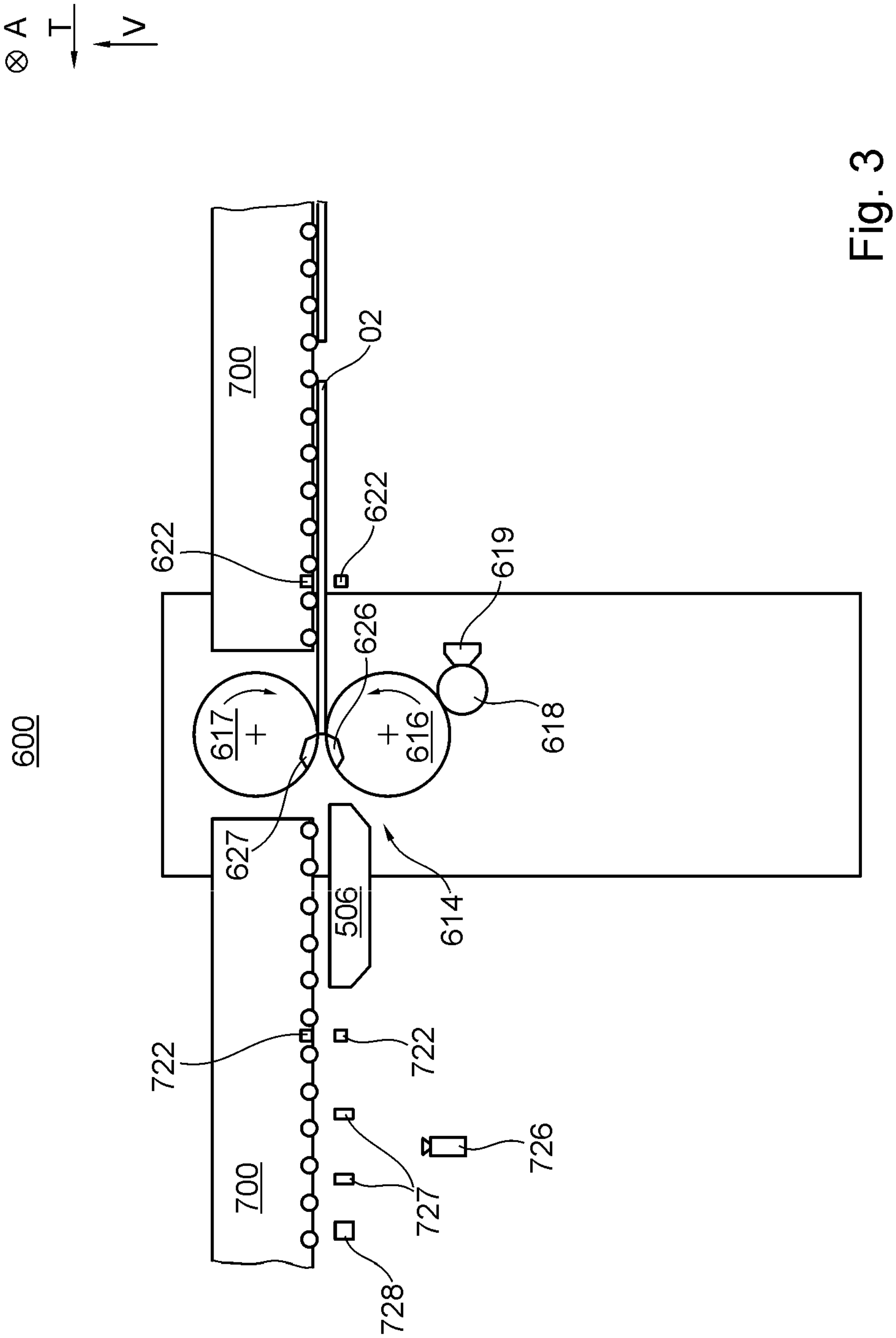
FIG. 3 a schematic representation of two inspection devices arranged after a last application unit in a transport direction.
Figure 4:
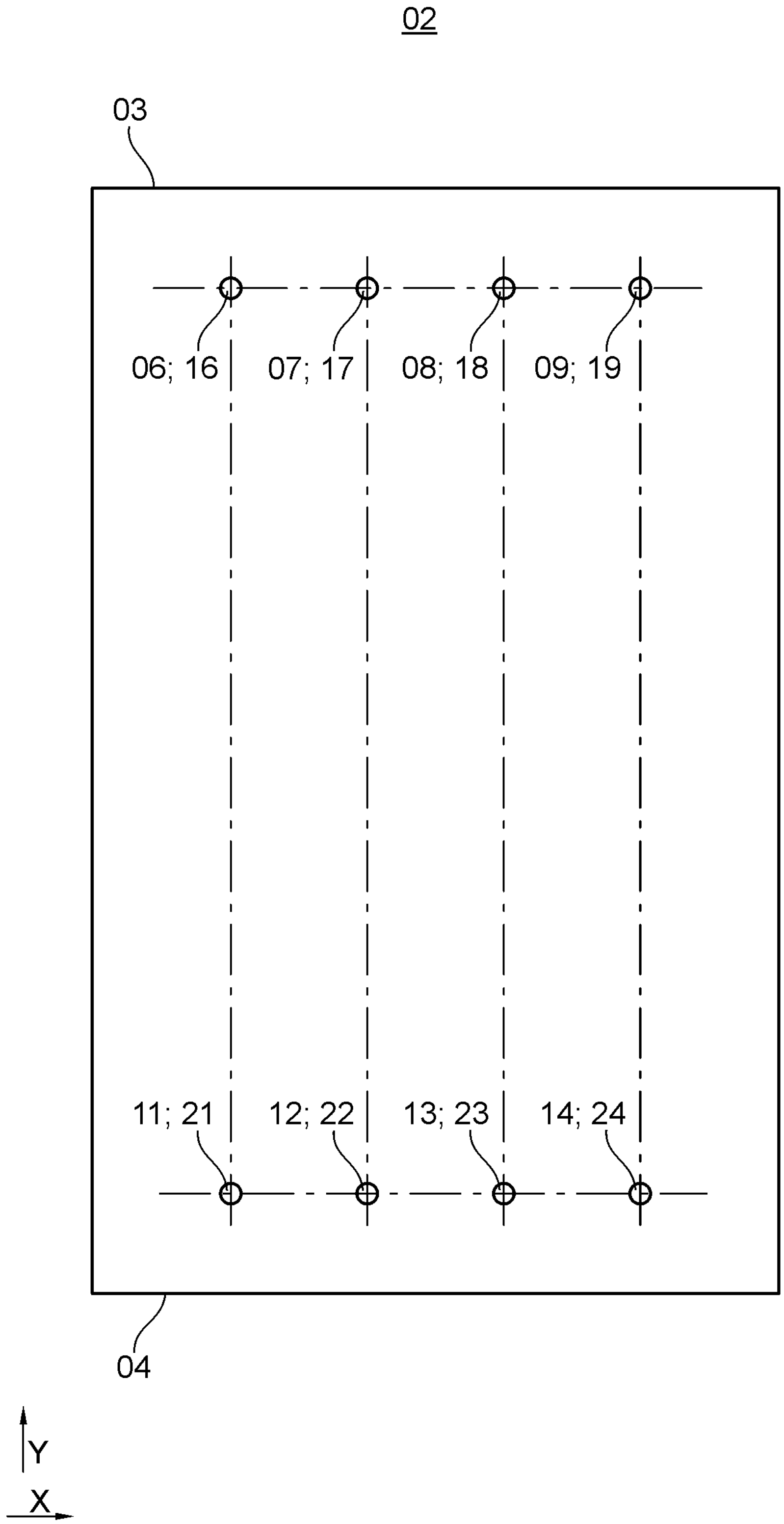
FIG. 4 a sheet including a first and a second register mark, each arranged in its reference position, for four application mechanisms, for example.
Figure 5:
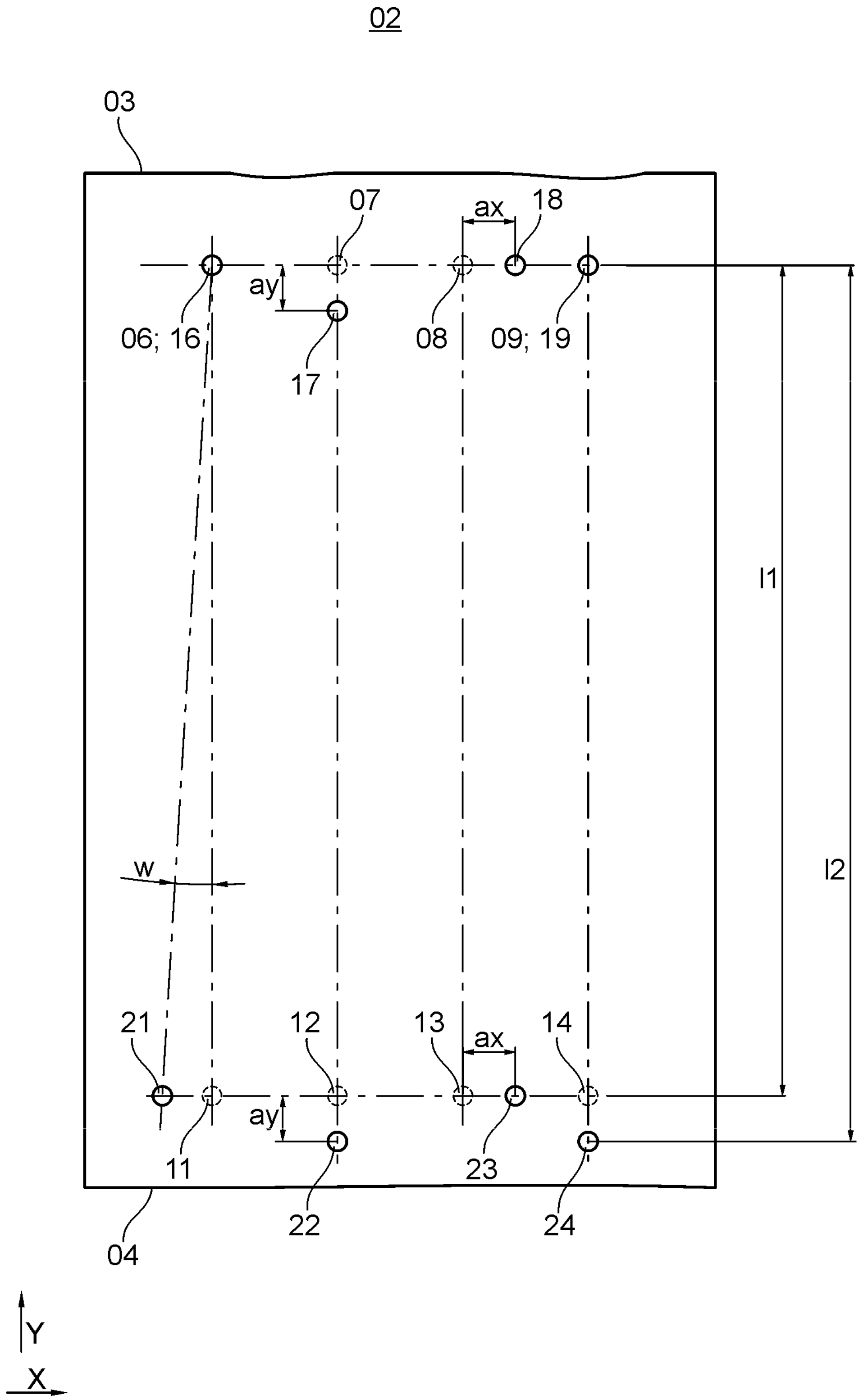
FIG. 5 a sheet including a first and a second register mark in each case, which deviate from the reference position, for four application mechanisms, for example.
Figure 6:
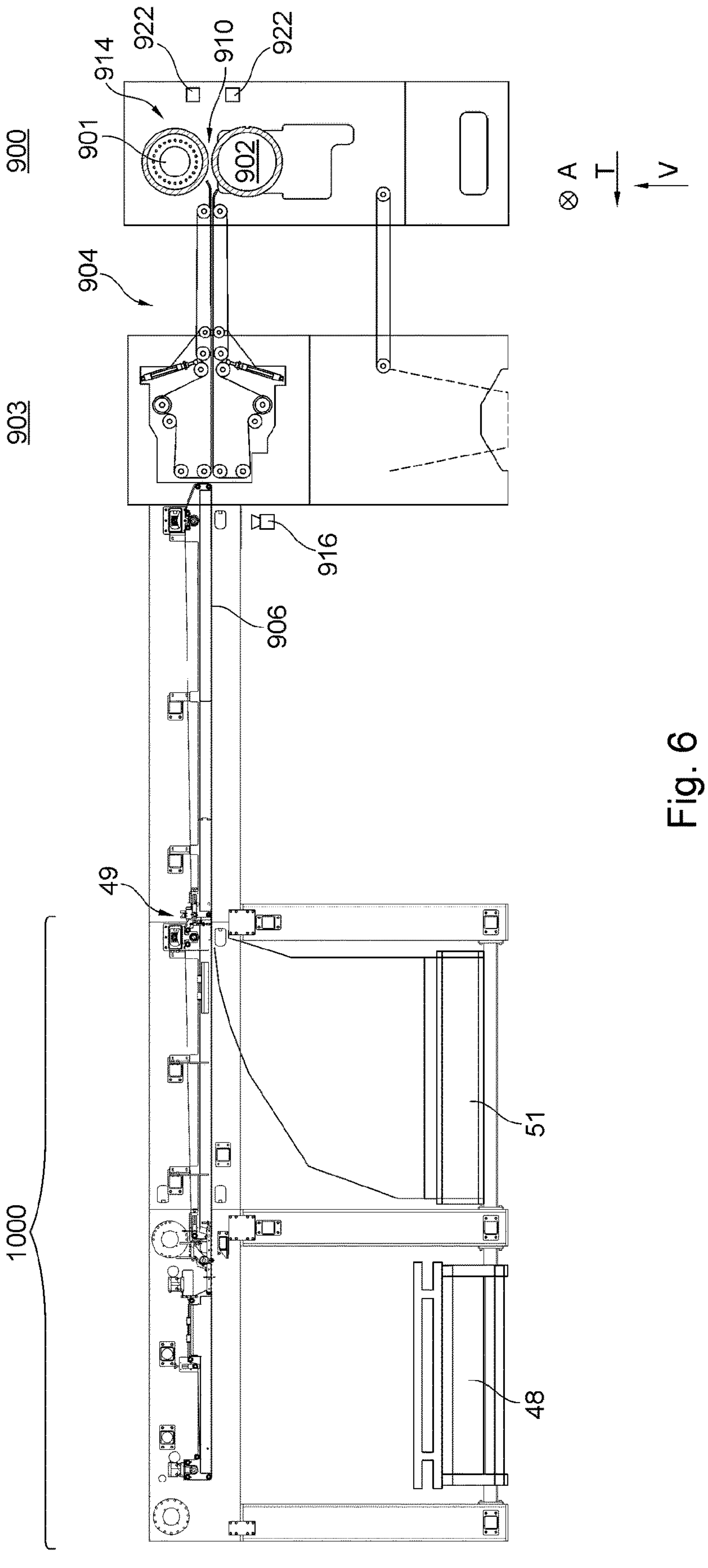
FIG. 6 a schematic representation of a shaping device and of a delivery unit comprising at least one inspection device after the shaping device in the transport direction.
Figure 7:
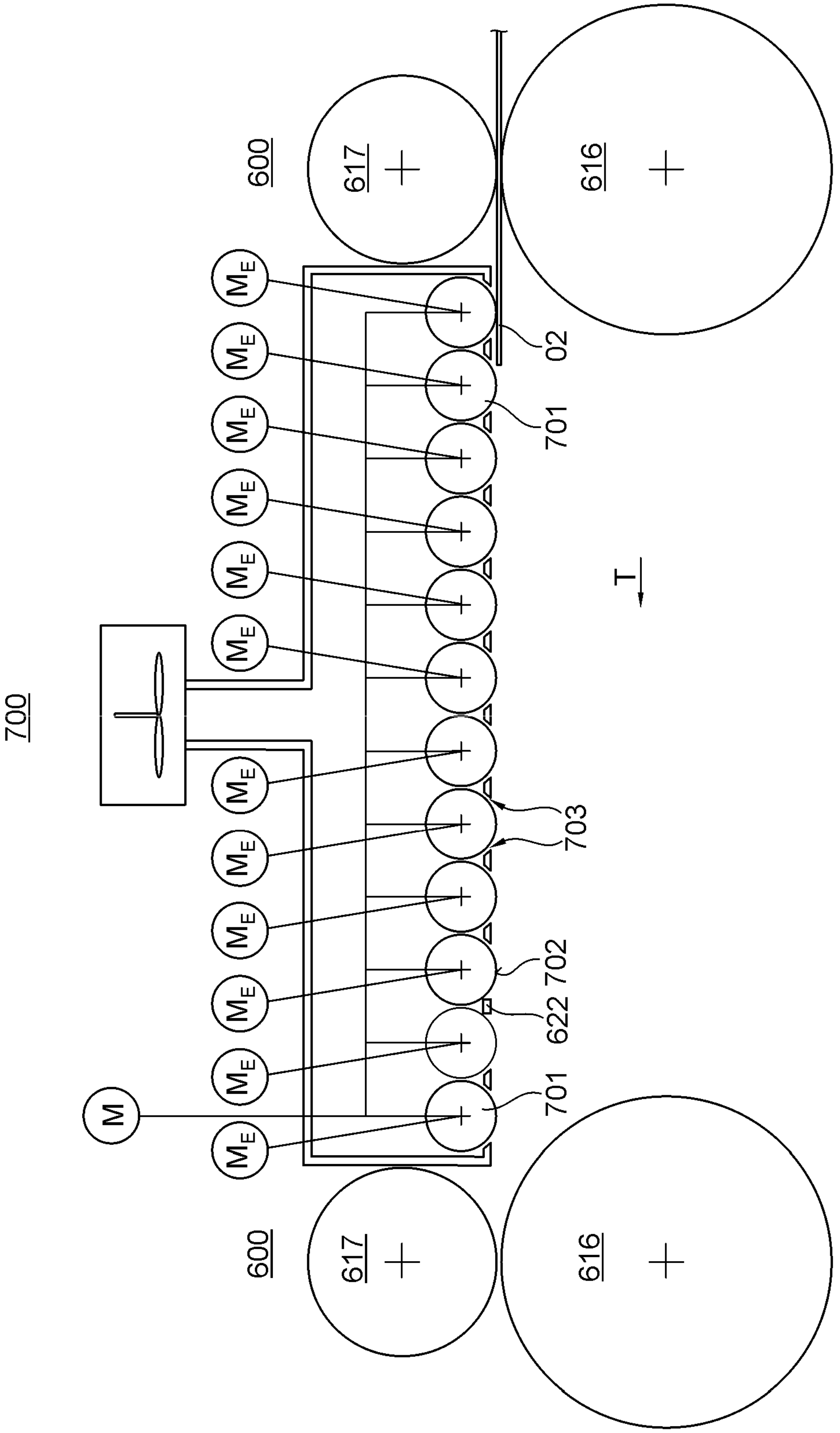
FIG. 7 a schematic representation of a suction transport means, designed as a roller suction system, between two processing units.
Figure 8:
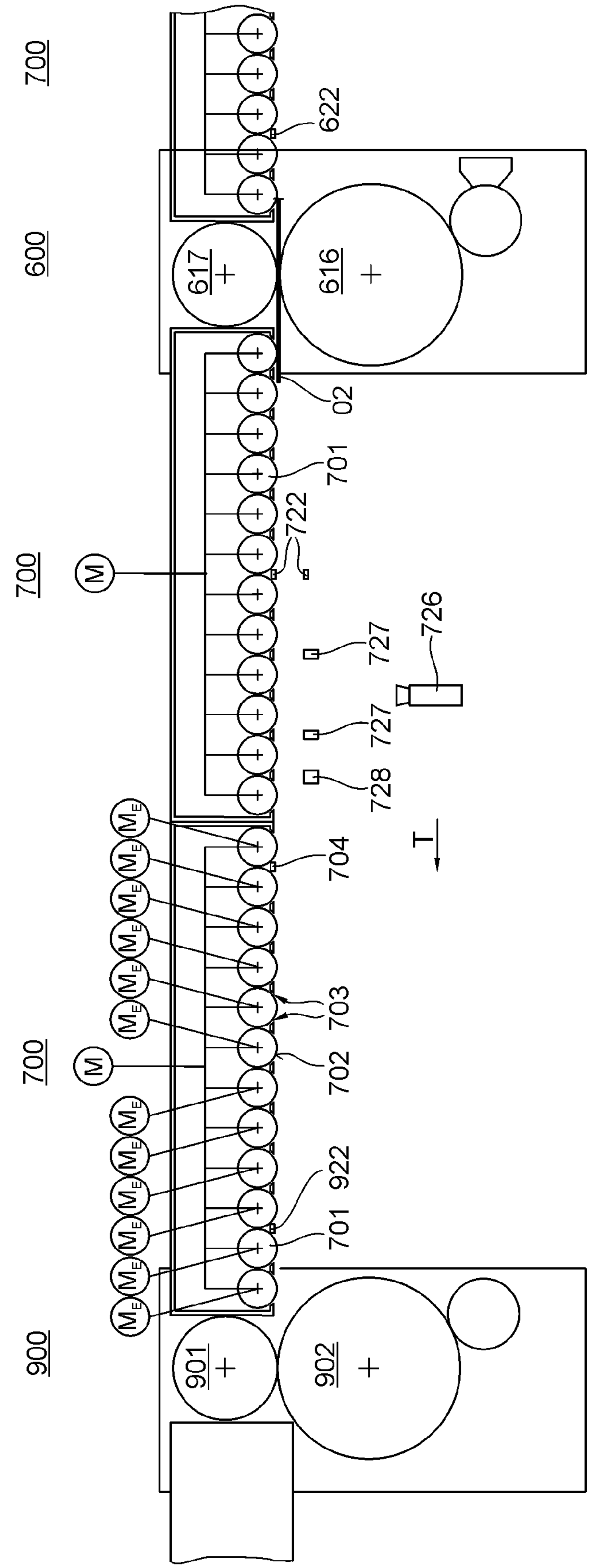
FIG. 8 an exemplary representation of a transport unit, arranged between an application unit and a die-cutting unit, for aligning substrate, as well as inspection devices, arranged upstream thereof, at a further transport unit.
Figure 9:
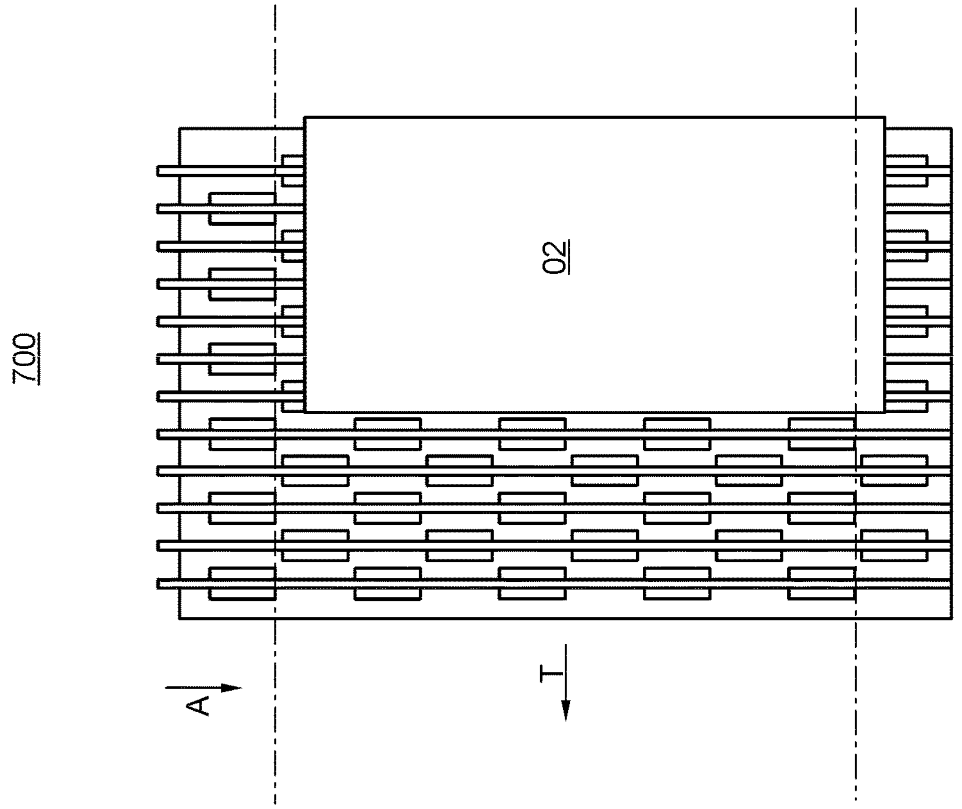
FIG. 9 a schematic representation of an alignment of substrate at a transport unit with lateral offset, wherein a substrate with lateral offset arrives at the transport unit.
Figure 10:
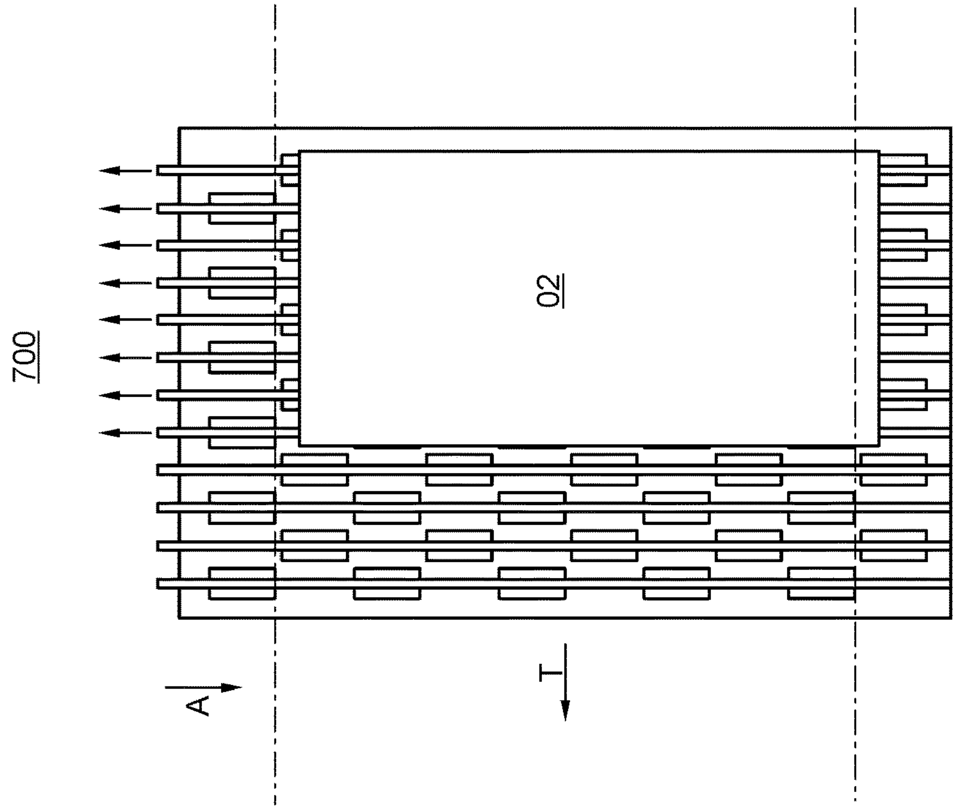
FIG. 10 a schematic representation of the alignment of substrate at a transport unit with lateral offset according to FIG. 9, wherein transport elements in contact with the substrate are being axially adjusted.
Figure 11:
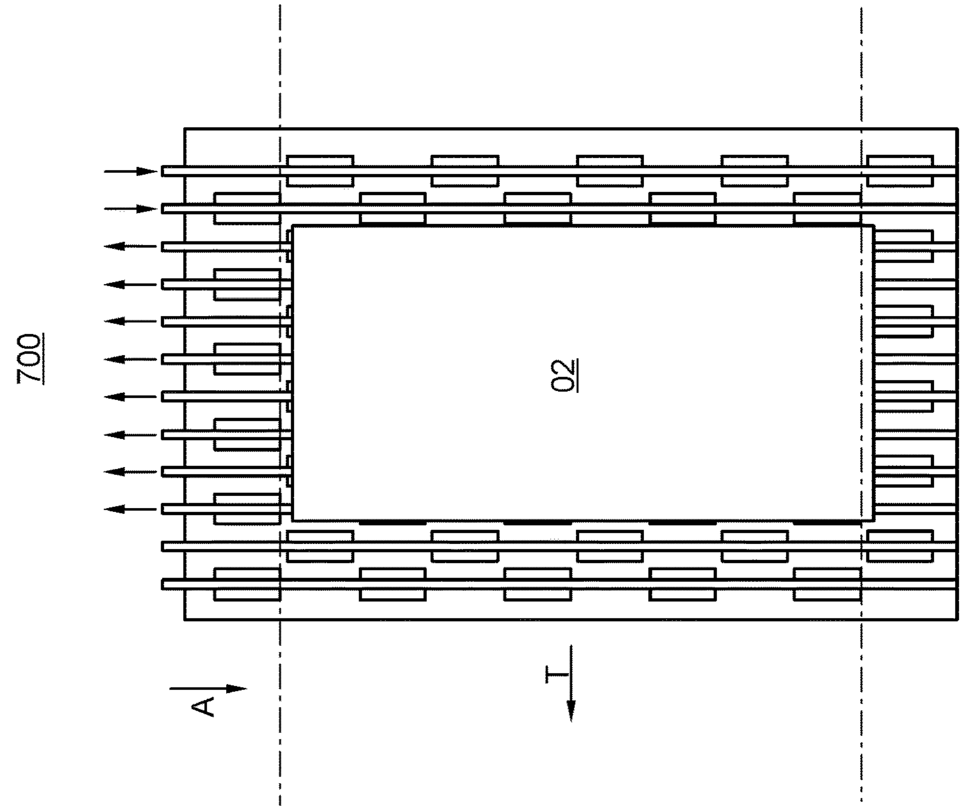
FIG. 11 a schematic representation of the alignment of substrate at a transport unit with lateral offset according to FIG. 9 and FIG. 10, wherein transport elements in contact with the substrate are being axially adjusted, and wherein transport elements no longer in contact with the substrate are returned into a starting position from the adjusted position.
Figure 12:
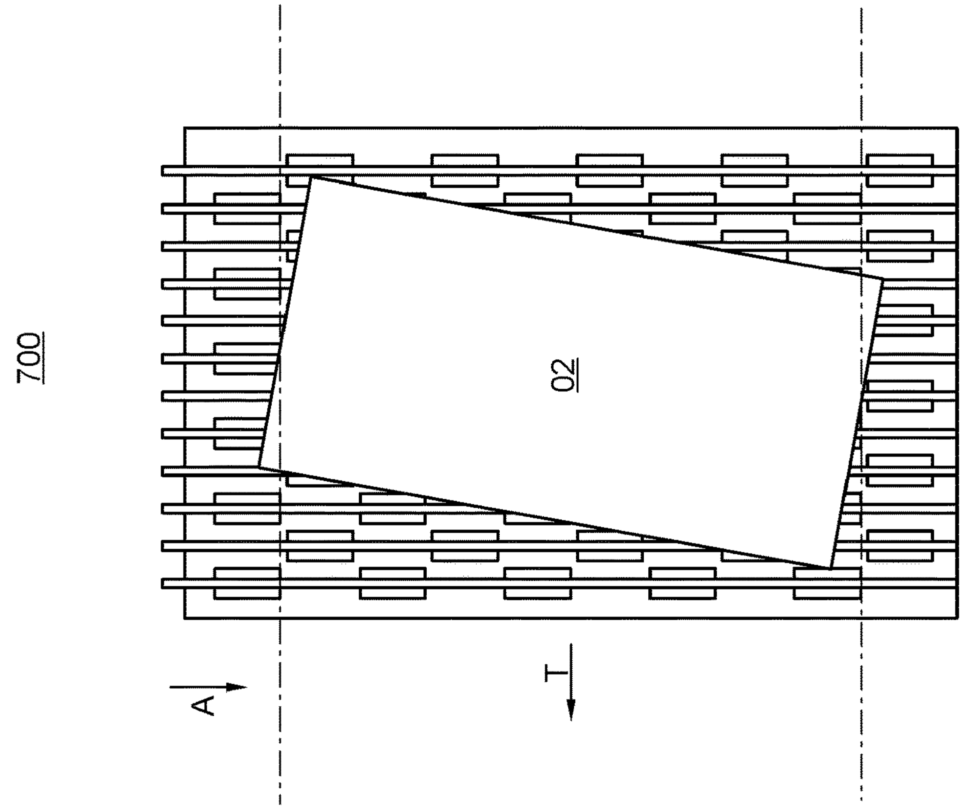
FIG. 12 a schematic representation of an alignment of substrate at a transport unit with the substrate in a skewed position, wherein a substrate in a skewed position arrives at the transport unit.
Figure 13:
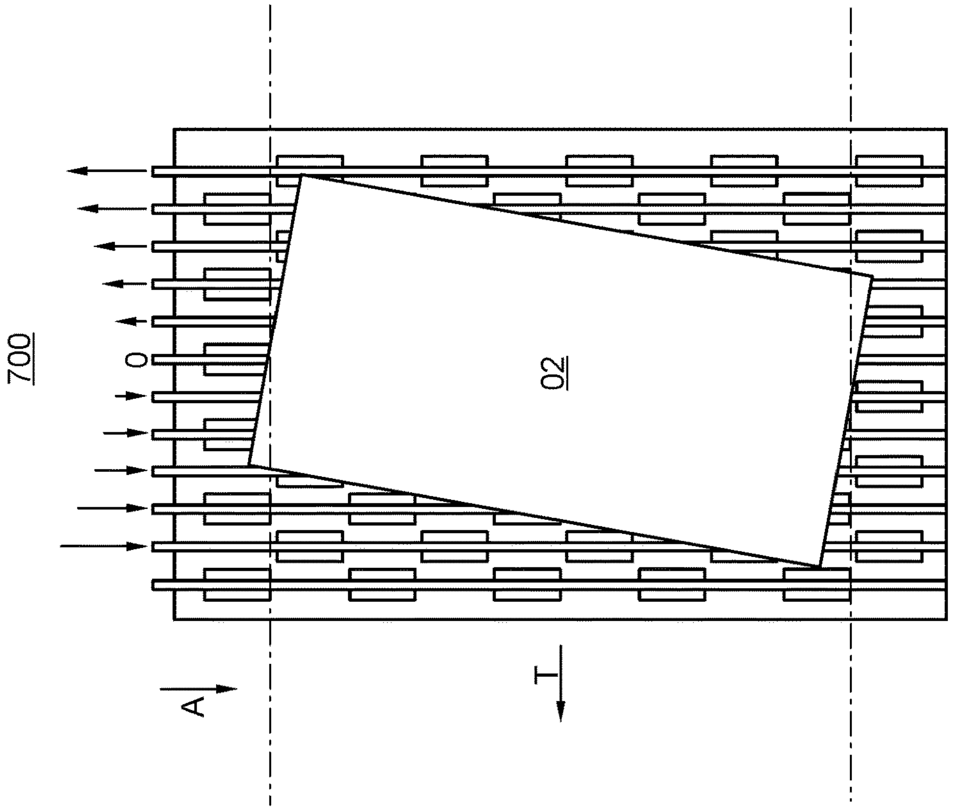
FIG. 13 a schematic representation of the alignment of substrate at a transport unit with the substrate in a skewed position according to FIG. 12, wherein transport elements are being axially adjusted to compensate for the skewed position.
Figure 14:
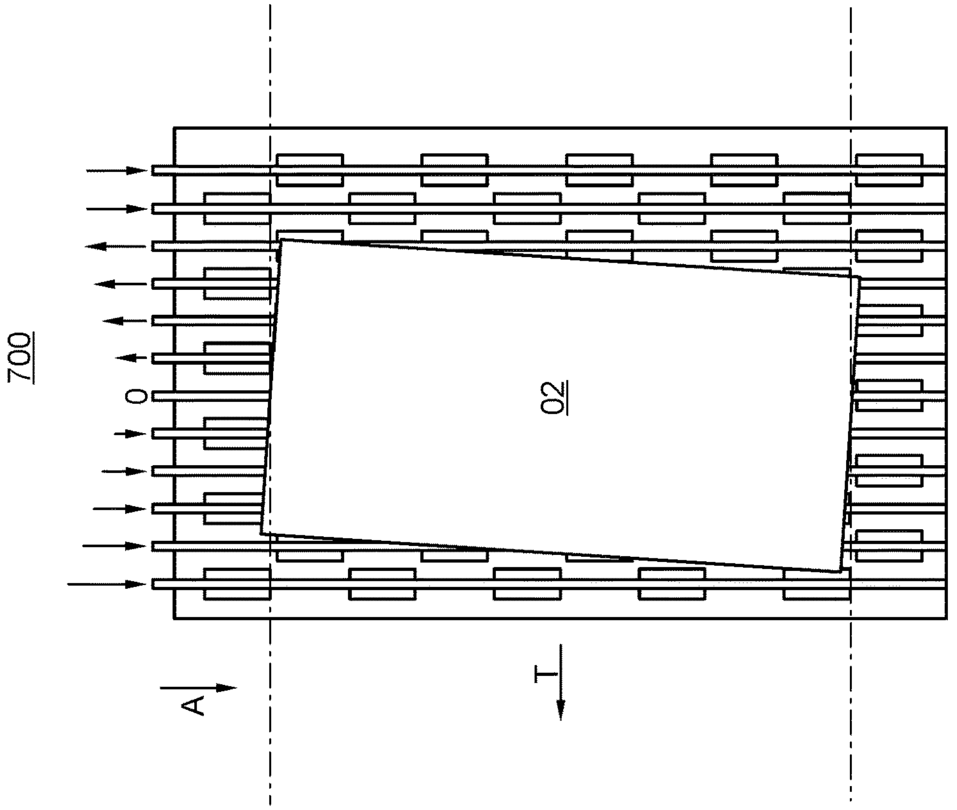
FIG. 14 a schematic representation of the alignment of substrate at a transport unit with the substrate in a skewed position according to FIG. 12 and FIG. 13, wherein transport elements are being axially adjusted to compensate for the skewed position, and wherein a transport element that is no longer in contact with the substrate is returned into a starting position from the adjusted position.
Figure 15:
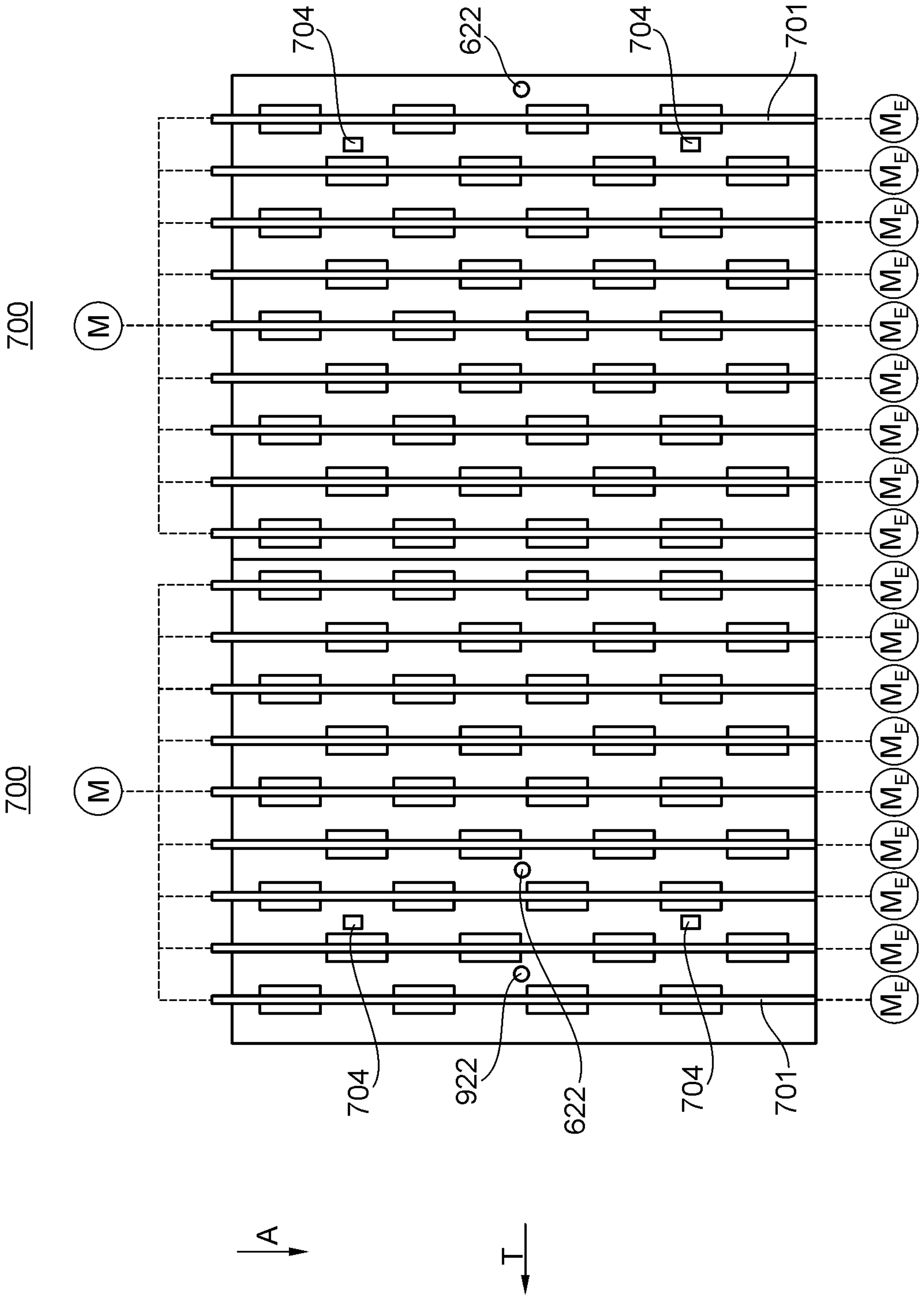
FIG. 15 a preferred embodiment of two transport units for aligning substrate along the transport path with sensors for substrate alignment, wherein each of the transport units comprises a main drive and the transport elements of the transport units comprise dedicated drives.
Figure 16:
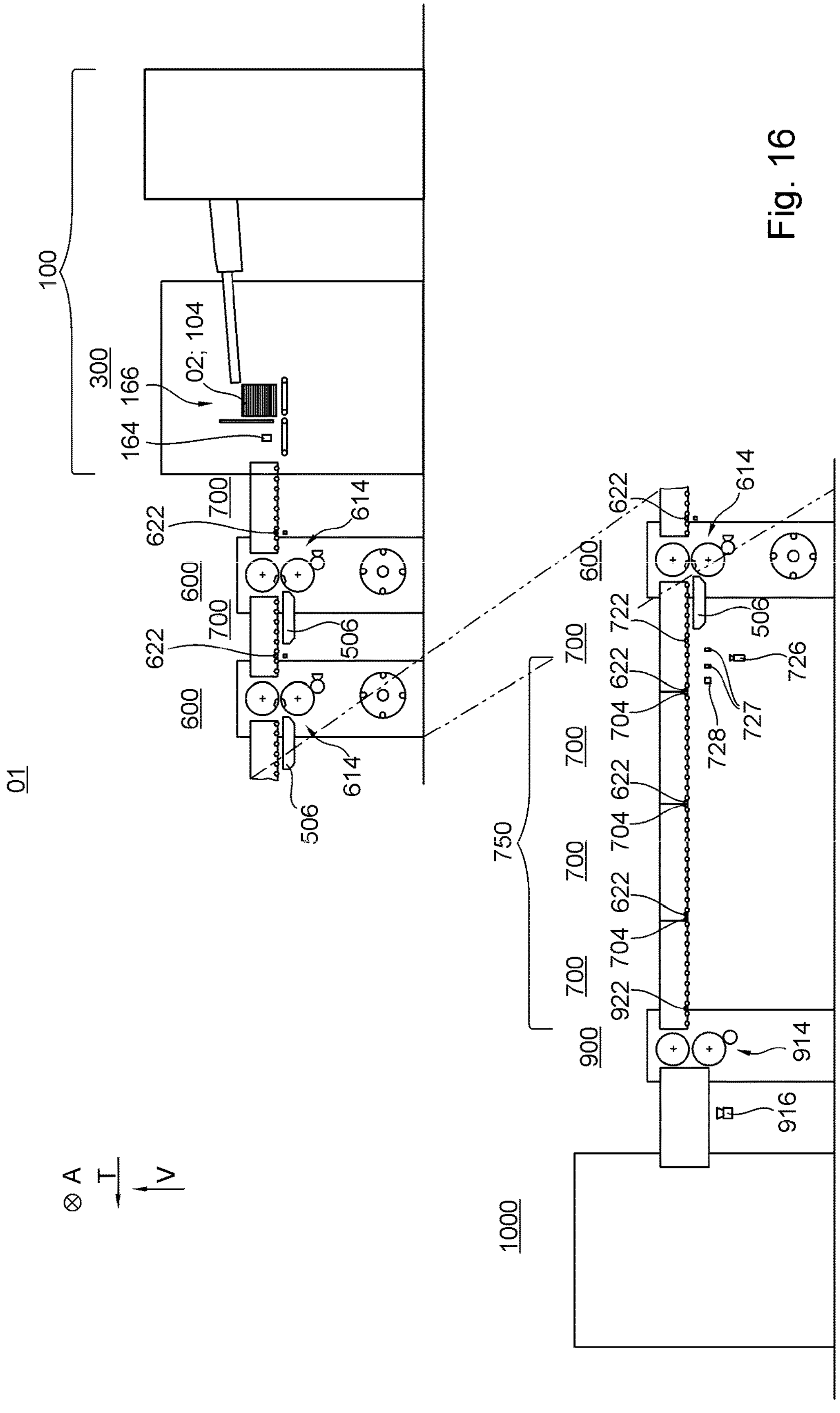
FIG. 16 a schematic representation of an exemplary processing machine, which comprises an alignment section including at least one transport unit for the alignment of substrate between a last application unit and a shaping unit.

A processing machine 01 is preferably designed as a printing machine 01 and/or as a shaping machine 01, in particular a die-cutting machine 01, more preferably a rotary die-cutting machine. The printing machine 01 is preferably designed as a flexographic printing machine 01.

The processing machine 01 is preferably referred to as a printing machine 01 when it comprises at least one application mechanism 614 designed as a printing unit 614 and/or at least one printing unit 600 designed as a unit 600, in particular regardless of whether it comprises additional units for processing substrate 02. A processing machine 01 designed as a printing machine 01 also comprises, for example, at least one additional such unit 900, for example at least one shaping unit 900, which is preferably designed as a die-cutting unit 900, more preferably as a die-cutting device 900. The processing machine 01 is preferably referred to as a shaping machine 01 when it comprises at least one shaping mechanism 914 and/or at least one shaping unit 900, in particular regardless of whether it comprises additional units 600 for processing substrate 02. The processing machine 01 is preferably referred to as a die-cutting machine 01 when it comprises at least one die-cutting mechanism 914 designed as a shaping mechanism 914 and/or at least one die-cutting unit 900 and/or at least one die-cutting device 900, in particular regardless of whether it comprises additional units 600 for processing substrate 02. A processing machine 01 designed as a shaping machine 01 or die-cutting machine 01 also comprises, for example, at least one further unit 600 for processing substrate 02, for example at least one printing unit 600 and/or at least one printing mechanism 614.

The processing machine 01 comprises at least two processing units 600; 900, which carry out processing operations that differ from one another. The at least one application unit 600 and/or the at least one shaping unit 900, preferably die-cutting unit 900, are in each case a processing unit 600; 900 of the processing machine 01, preferably for processing substrate 02. Above and below, processing a substrate 02 preferably describes changing at least one property of the relevant substrate 02 with respect to its physical properties and/or material properties, in particular the mass and/or shape and/or appearance thereof. The substrate 02 can be converted into at least one intermediate product that can be further worked and/or into an end product by at least one processing operation. Preferably, the at least one processing unit 600; 900, preferably the at least one application unit 600 and/or the at least one shaping unit 900, more preferably each processing unit 600; 900, in particular an application unit 600 and/or a processing unit 600; 900 following an application unit 600, comprises at least one drive for axially adjusting the at least one plate cylinder 616; 901 of the processing unit 600; 900. The at least one drive for axially adjusting the at least one plate cylinder 616; 901 of the processing unit 600; 900 is preferably designed so as to axially adjust in each case the plate cylinder 616; 901 of the processing unit 600; 900. The plate cylinder 616; 901 of the at least one processing unit 616; 900 is preferably axially adjusted by means of the at least one drive for axially adjusting the plate cylinder 616; 901. Preferably, the at least one processing unit 600; 900, preferably the at least one application unit 600 and/or the at least one shaping unit 900, more preferably each processing unit 600; 900, in particular an application unit 600 and/or a processing unit 600; 900 following an application unit 600, comprises at least one drive in the circumferential direction of the at least one plate cylinder 616; 901 of the processing unit 600; 900. The at least one drive in the circumferential direction of the at least one plate cylinder 616; 901 of the processing unit 600; 900 is preferably designed so as to accelerate and/or decelerate in each case the plate cylinder 616; 901 of the processing unit 600; 900 in the circumferential direction and/or is preferably designed so as to adapt in each case a processing length of the processing unit 600; 900 by accelerating and/or decelerating the plate cylinder 616; 901 in the circumferential direction. The at least one drive in the circumferential direction of the at least one plate cylinder 616; 901 of the processing unit 600; 900 preferably in each case accelerates and/or decelerates the plate cylinder 616; 901 of the processing unit 600; 900 in the circumferential direction. In addition or as an alternative, the at least one drive in the circumferential direction of the at least one plate cylinder 616; 901 of the processing unit 600; 900 in each case preferably adapts a processing length of the processing unit 600; 900 by accelerating and/or decelerating the plate cylinder 616; 901 in the circumferential direction. Preferably, the at least one drive of the plate cylinder 616; 901, preferably at least the axial adjustment and/or the speed in the circumferential direction, is controlled by at least one inspection device 726; 728; 916, preferably the color register monitoring system 728 and/or the die-cutting monitoring system 916.

In a preferred embodiment, the processing machine 01, in particular a sheet processing machine 01, preferably comprises a unit 100 designed as a feeder 100, preferably as a sheet feeder 100, and/or at least one printing mechanism 614 designed as an application mechanism 614 for applying at least one print image onto substrate 02. Thus, if the processing machine 01 comprises at least one printing mechanism 614 and/or at least one printing unit 600, and also comprises at least one shaping mechanism 914 and/or at least one shaping unit 900, it is designed both as a printing machine 01 and as a shaping machine 01. If the processing machine 01 comprises at least one printing mechanism 614 and/or at least one printing unit 600, and also comprises at least one die-cutting mechanism 914 and/or at least one die-cutting unit 900 and/or at least one die-cutting device 900, it is accordingly designed both as a printing machine 01 and as a shaping machine 01, in particular a die-cutting machine 01.

The processing machine 01 is preferably designed as a sheet processing machine 01, that is, as a processing machine 01 for processing sheet-format substrate 02 or sheets 02, in particular sheet-format print substrate 02. For example, the sheet processing machine 01 is designed as a sheet-fed printing machine 01 and/or as a sheet-fed shaping machine 01 and/or as a sheet-fed die-cutting machine 01. The processing machine 01 is further preferably designed as a corrugated cardboard sheet processing machine 01, that is, as a processing machine 01 for processing sheet-format substrate 02 or sheets 02 made of corrugated cardboard 02, in particular sheet-format print substrate 02 made of corrugated cardboard 02. The processing machine 01 is further preferably designed as a sheet-fed printing machine 01, in particular as a corrugated cardboard sheet printing machine 01, that is, as a printing machine 01 for coating and/or printing sheet-format substrate 02 or sheets 02 made of corrugated cardboard 02, in particular sheet-format print substrate 02 made of corrugated cardboard 02. The printing machine 01 is designed as a printing machine 01 that operates according to a printing forme-based printing method, for example.

The processing machine 01 is designed so as to process substrate 02, preferably sheet-format substrate 02. The substrate 02 preferably includes at least one multiple-up copy. A multiple-up is preferably the region of the substrate 02 that is either designed as a product of the processing machine 01, in particular as an intermediate product for producing an end product, and/or, for example, is further worked and/or is designed to be further workable into a desired or required end product. The desired or required end product here, which is preferably generated by further processing the respective multiple-up, is preferably a folder-type box and/or a packaging. Unless an explicit distinction is made, the term sheet-format substrate 02, in particular print substrate 02, specifically sheet 02, shall generally encompass any flat substrate 02 present in the form of sections, that is, including substrates 02 in tabular form or panel form, i.e., including boards or panels. The sheet-format substrate 02 or sheet 02 thus defined is formed, for example, of paper or paperboard, that is, as a sheet of paper or paperboard, or as sheets 02, boards, or optionally panels made of plastic, cardboard, glass, or metal. More preferably, the substrate 02 is corrugated cardboard 02, in particular corrugated cardboard sheets 02. The at least one sheet 02 is preferably designed as corrugated cardboard 02. A thickness of a sheet 02 shall preferably be understood to mean a dimension orthogonal to a largest surface area of the sheet 02. This largest surface area is also referred to as the main surface area. Preferably, printing fluid is applied at least partially and/or at least on one side of the sheet 02 on the at least one main surface area. The thickness of the sheets 02 is, for example, at least 0.1 mm (zero point one millimeters), more preferably at least 0.3 mm (zero point three millimeters), and still more preferably at least 0.5 mm (zero point five millimeters). Considerably greater thicknesses are also customary, especially in the case of corrugated cardboard sheets 02, for example at least 4 mm (four millimeters) or also 10 mm (ten millimeters) and more. Corrugated cardboard sheets 02 are relatively stable and are therefore not very flexible. Corresponding adjustments of the processing machine 01 therefore facilitate the processing of sheets 02 of great thickness.

The respective, preferably at least one, sheet 02 is preferably made of paper or cardboard or paperboard. More preferably, the respective sheet 02 is made of cardboard, preferably corrugated cardboard. According to DIN 6730, paper is a flat material, consisting mainly of fibers derived from vegetable sources, which is formed by the dewatering of a fiber suspension on a sieve. In the process, a card web is created, which is subsequently dried. The basis weight of paper is preferably a maximum of 225 g/m2 (two hundred and twenty-five grams per square meter). According to DIN 6730, cardboard is a flat material, consisting mainly of fibers derived from vegetable sources, which is formed by the dewatering of a fiber suspension on a sieve or between two sieves. The fiber structure is compressed and dried. Cardboard is preferably manufactured from cellulose and/or by gluing or pressing. Cardboard is preferably designed as solid board or corrugated cardboard 02. Above and below, corrugated cardboard 02 is cardboard made of one or more layers of corrugated paper that is glued to one layer or between multiple layers of another, preferably smooth, paper or cardboard. The basis weight of cardboard is preferably more than 225 g/m2 (two hundred and twenty-five grams per square meter). Above and below, the term paperboard refers to a sheet material that is preferably primed on one side and made of paper, preferably having a basis weight of at least 150 g/m2 (one hundred and fifty grams per square meter) and no more than 600 g/m2 (six hundred grams per square meter). Paperboard preferably has high strength relative to paper.

The processing machine 01 comprises several units 100; 300; 600; 700; 900; 1000. A unit in this context shall preferably be understood to mean a group of devices that cooperate functionally, in particular in order to carry out a preferably self-contained processing operation of sheets 02. At least two, for example, and preferably at least three, and more preferably all of the units 100; 300; 600; 700; 900; 1000 are designed as modules 100; 300; 600; 700; 900; 1000 or at least each is assigned to such a module. A module in this context shall in particular be understood to mean a respective unit or a structure made up of multiple units, which preferably comprises at least one transport means and/or at least a dedicated drive controllable by open-loop and/or closed-loop control, and/or as an independently functioning module and/or as an individually manufactured and/or separately assembled machine unit or functional assembly. A dedicated drive, controllable by open-loop and/or closed-loop control, of a unit or module shall in particular be understood to mean a drive that is used to power the movements of components of this unit or module and/or that is used to transport substrate 02, in particular sheets 02, through this particular unit or module and/or through at least one operating zone of this particular unit or module and/or that is used to directly or indirectly drive at least one component of the particular unit or module that is intended for contact with sheets 02. The dedicated drive of a unit or module which can be controlled by open loop and/or closed loop is preferably designed to power movements of components of this unit or module and/or designed to effect a transport of substrate 02 and/or designed to directly or indirectly drive at least one component of the particular unit or module which is intended for contact with sheets 02. These drives of the units 100; 300; 600; 700; 900; 1000 of the processing machine 01 are preferably embodied, in particular, as closed loop position-controlled electric motors. A main drive is preferably connected to at least two components of the processing machine 01 and/or is preferably designed so as to drive the at least two components jointly, which more preferably are mechanically and/or virtually coupled to one another or can be synchronized with one another. A dedicated drive is preferably designed so as to drive a component, preferably independently of further drives and/or components. A dedicated drive, preferably at least one dedicated drive $M_E$, of a transport element 701 is preferably a closed loop position-controlled electric motor, for example, alternatively, rotation angle-controlled. A main drive, preferably at least one main drive M of the transport unit 700, is preferably a closed loop position-controlled electric motor, for example, alternatively, rotation angle-controlled.

Each unit 100; 300; 600; 700; 900; 1000 preferably comprises at least one drive control system and/or at least one drive controller, which is assigned to the respective at least one drive of the particular unit 100; 300; 600; 700; 900; 1000. The drive control systems and/or drive controllers of the individual units 100; 300; 600; 700; 900; 1000 can preferably be operated individually and independently of one another. More preferably, the drive control systems and/or drive controllers of the individual units 100; 300; 600; 700; 900; 1000 are linked and/or can be linked in terms of circuitry, in particular by means of at least one BUS system, to one another and/or to a machine control system of the processing machine 01, in such a way that coordinated open-loop and/or closed-loop control of the drives of several or all units 100; 300; 600; 700; 900; 1000 of the processing machine 01 is and/or can be carried out. Accordingly, the individual units 100; 300; 600; 700; 900; 1000 and/or in particular modules 100; 300; 600; 700; 900; 1000 of the processing machine 01 can be and/or are operated preferably electronically synchronized with one another, at least with respect to the drives thereof, in particular by means of at least one virtual and/or electronic master axis. For this purpose, the virtual and/or electronic master axis is preferably specified, for example by a higher-level machine control system of the processing machine 01. As an alternative or in addition, the individual units 100; 300; 600; 700; 900; 1000 of the processing machine 01 are and/or can be mechanically synchronized with one another, for example, at least with respect to the drives thereof. Preferably, however, the individual units 100; 300; 600; 700; 900; 1000 of the processing machine 01 are mechanically decoupled from one another, at least with respect to the drives thereof.

The spatial area provided for the transport of substrate 02, which the substrate 02, if present, at least temporarily occupies, is the transport path. The transport path is preferably defined by at least one device for guiding the substrate 02 in an operating state of the processing machine 01. Unless described otherwise, each of the units 100; 300; 600; 700; 900; 1000 of the processing machine 01 is preferably characterized in that the section of a transport path provided for a transport of sheets 02, which is defined by the respective unit 100; 300; 600; 700; 900; 1000, is at least substantially flat, and more preferably completely flat. A substantially flat section of the transport path provided for the transport of sheets 02 in this context shall be understood to mean a section that has a minimum radius of curvature of at least two meters, more preferably at least five meters, and still more preferably at least ten meters, and still more preferably at least fifty meters. A completely flat section has an infinitely large radius of curvature and is thus likewise substantially flat and therefore likewise has a minimum radius of curvature of at least two meters. Unless described otherwise, each of the units 100; 300; 600; 700; 900; 1000 of the processing machine 01 is preferably characterized in that the section of the transport path provided for the transport of sheets 02, which is defined by the respective unit 100; 300; 600; 700; 900; 1000, extends at least substantially horizontally, and more preferably exclusively horizontally. This transport path preferably extends in a direction T, in particular in the transport direction T. A substantially horizontal transport path provided for the transport of sheets 02 means in particular that, within the entire region of the particular unit 100; 300; 600; 700; 900; 1000, the provided transport path only has one or more directions that deviate by no more than 30° (thirty degrees), preferably no more than 15° (fifteen degrees), and more preferably no more than 5° (five degrees) from at least one horizontal direction. The transport path provided for the transport of sheets 02 preferably begins at the point where the sheets 02 are removed from a feeder pile 104.

The direction T of the transport path, in particular the transport direction T, is in particular the direction T in which the sheets 02 are transported at the point at which the direction T is measured. The transport direction T provided in particular for the transport of sheets 02 is preferably the direction T that is preferably oriented at least substantially, and more preferably entirely, horizontally and/or that preferably points from a first unit 100; 300; 600; 700; 900; 1000 of the processing machine 01 to a last unit 100; 300; 600; 700; 900; 1000 of the processing machine 01, in particular from a sheet feeder unit 100 or a substrate feed device 100 on the one hand to a delivery unit 1000 or a substrate output device 1000 on the other hand, and/or that preferably points in a direction in which the sheets 02 are transported, apart from vertical movements or vertical components of movements, in particular from a first point of contact with a unit 300; 600; 700; 900; 1000 of the processing machine 01 that is arranged downstream from the substrate feed device 100 or a first point of contact with the processing machine 01 to a last point of contact with the processing machine 01. Regardless of whether the infeed device 300 is an independent unit 300 or module 300 or is a component of the substrate feed device 100, the transport direction T is preferably the direction T in which a horizontal component of a direction points which is oriented from the infeed device 300 to the substrate output device 1000.

A direction A, preferably the transverse direction A, is preferably a direction A that is oriented orthogonally to the transport direction T of the sheets 02 and/or orthogonally to the intended transport path of the sheets 02 through the at least one application unit 600 and/or through the at least one shaping unit 900 and/or through the at least one sheet delivery unit 1000. The transverse direction A is preferably a horizontally oriented direction A. A longitudinal axis of the at least one plate cylinder 616 is preferably oriented parallel to the transverse direction A. The transverse direction A is preferably an axial direction.

A working width of the processing machine 01 and/or of the at least one application unit 600 and/or of the at least one shaping unit 900 and/or of the at least one sheet delivery unit 1000 is preferably a dimension that extends preferably orthogonally to the provided transport path of the sheets 02 through the at least one application unit 600 and/or the at least one shaping unit 900 and/or the at least one sheet delivery unit 1000, more preferably in the transverse direction A. The working width of the processing machine 01 preferably corresponds to a maximum width that a sheet 02 may have in order to still be processable by the processing machine 01, that is, in particular a maximum sheet width that can be processed by the processing machine 01. The width of a sheet 02 shall, in particular, be understood to mean the dimension thereof in the transverse direction A. This is preferably independent of whether this width of the sheet 02 is greater than or smaller than a horizontal dimension of the sheet 02 orthogonal thereto, which more preferably represents the length of this sheet 02 in the transport direction T. The working width of the processing machine 01 preferably corresponds to the working width of the at least one application unit 600 and/or of the at least one shaping unit 900 and/or of the at least one sheet delivery unit 1000. The working width of the processing machine 01, in particular sheet processing machine 01, is preferably at least 100 cm (one hundred centimeters), more preferably at least 150 cm (one hundred and fifty centimeters), still more preferably at least 160 cm (one hundred and sixty centimeters), still more preferably at least 200 cm (two hundred centimeters), and still more preferably at least 250 cm (two hundred and fifty centimeters).

A vertical direction V preferably denotes a direction that is preferably directed from a ground perpendicularly upwardly. The vertical direction V is preferably arranged parallel to the normal vector of a plane spanned by the transport direction T and the transverse direction A. The height of components is preferably in the vertical direction V. For example, in the region of the shaping device 900, the vertical direction V is preferably oriented so as to point from the print substrate 02 arranged in a processing point 910 toward a plate cylinder 901 of the shaping device 900.

A direction X preferably denotes the direction along the lateral extension of the substrate 02. In the case of a substrate 02 that is arranged in the processing machine 01, the direction X is preferably oriented parallel to the transverse direction A, that is, an axial direction. The direction X preferably points from a first side edge of the substrate 02 to a second side edge of the substrate 02 which is located opposite the first side edge. A direction Y preferably denotes the direction along the longitudinal extension of the substrate 02. In the case of a substrate 02 that is arranged in the processing machine 01, the direction Y is preferably oriented parallel to the transport direction T, that is, preferably points in the direction of the transport path. The direction Y preferably points from a trailing edge 04 of the substrate 02 to the leading edge 03 thereof. The leading edge 03 is preferably the edge 03 of the substrate 02 which, along the transport path in the processing machine 01, is the first edge of the substrate 02 to come in contact with the particular units 100; 300; 600; 700; 900; 1000, and in particular with the processing points 621; 910.

The processing machine 01 preferably comprises at least one substrate feed device 100, which more preferably is designed as a unit 100, in particular a substrate feed unit 100, and/or as a module 100, in particular a substrate feed module 100. In particular in the case of a sheet processing machine 01, the at least one substrate feed device 100 is preferably designed as a sheet feeder 100 and/or sheet feeder unit 100 and/or sheet feeder module 100. Preferably, the at least one substrate feed device 100 is the first unit 100 of the processing machine 01, in particular in the transport direction T. The substrate feed device 100 is preferably designed so as to feed substrate 02, preferably sheets 02, to succeeding processing units 600; 900. The substrate feed device 100 preferably separates the substrates 02 so that the substrates 02 are transported consecutively, preferably spaced apart from one another, through the processing machine 01. The at least one substrate feed device 100 preferably comprises at least one acceleration means, preferably at least one primary acceleration means and/or at least one secondary acceleration means, for accelerating the substrate 02 to the processing speed. The at least one substrate feed device 100 preferably comprises at least one front stop and/or at least one lateral stop and/or at least one rear stop, which preferably aligns the at least one substrate 02. For example, at least one stop is fixed or movable, toward the substrate 02 and/or away from the substrate 02. Preferably, the at least one substrate 02 is aligned in the at least one substrate feed device 100 by means of the at least one fixed or movable stop. For example, the processing machine 01 comprises at least one unit designed as a conditioning device, in particular a conditioning unit, which is more preferably designed as a module, in particular as a conditioning module. Such a conditioning device is, for example, designed as a pre-processing device, in particular as a pre-processing device for applying primer, or as a post-processing device, in particular as a post-processing device for applying varnish. The processing machine 01 preferably comprises at least one unit designed as a pre-processing device, in particular a pre-processing unit, which more preferably is designed as a module, in particular as a pre-processing module, and represents a conditioning device. The processing machine 01 preferably comprises at least one post-processing device.

The processing machine 01 preferably comprises at least one unit 300, preferably an infeed device 300, which is more preferably designed as an infeed unit 300 and/or infeed module 300. Alternatively, the at least one infeed device 300 is designed as a component of the substrate feed device 100 or of another unit. The substrate feed device 100 preferably comprises the infeed unit 300. The infeed unit 300 preferably comprises the at least one feeder pile 104. The feeder pile 104 preferably comprises a multiplicity of sheets 02, which are preferably present at least temporarily in a stacked manner in a storage area 166.

For example, the processing machine 01 comprises at least one unit, preferably at least two, more preferably at least four, more preferably at least six, for example eight, units 600, for example the application unit 600, which is preferably designed as a module 600, in particular an application module 600. The at least one application unit 600 is preferably arranged and/or designed based on the function and/or application method. The at least one application unit 600 is preferably used to apply at least one respective application fluid or coating agent over the entire surface area and/or at least a portion of the surface area of the sheets 02. One example of an application unit 600 is a printing unit 600 or printing module 600, which is used in particular for applying printing ink and/or ink onto substrate 02, in particular sheets 02. In particular, the at least one application unit 600 is designed to apply application fluid, preferably printing ink and/or ink, for example over the entire surface area and/or a portion of the surface area of the sheets 02. Above and below, an optionally provided priming unit and/or an optional varnishing unit may also be considered to be such an application unit 600 or printing unit 600. The at least one application unit 600 preferably comprises the at least one application mechanism 614. At least one first application unit 600 in the transport direction T is preferably designed as a priming unit. At least one last application unit 600 in the transport direction T is preferably designed as a varnishing unit. Preferably, at least one, preferably at least four, application units 600, which are preferably arranged downstream from the priming unit and/or which are arranged upstream from the varnishing unit, are designed as a printing unit 600.

Independently, in particular, of the function of the application fluid that can be applied by the application units 600, these units can preferably be distinguished in terms of the application method thereof. One example of an application unit 600 is a forme-based application unit 600, which comprises, in particular, at least one fixed, physical, and preferably exchangeable printing forme for the application of printing fluid. Forme-based application units 600 preferably operate according to a planographic printing process, in particular an offset planographic printing process, and/or according to a gravure printing process, and/or according to a letterpress printing process, in particular preferably according to a flexographic printing process. The corresponding application unit 600 is preferably a flexographic application unit 600 or flexographic printing unit 600, in particular a flexographic application module 600 or flexographic printing module 600. In another preferred embodiment, the at least one application unit 600 is designed as an offset printing unit 600. A preferred embodiment of the application mechanism 614 is intended to provide application fluid from beneath onto, for example to print, substrate 02, in particular sheets 02 and/or print substrate 02. In this preferred embodiment of the application mechanism 614, the plate cylinder 616 is preferably arranged beneath the impression cylinder 617. In an alternative embodiment, the sheets 02 are printed from above. The printing unit 600 is then preferably designed in a mirror-inverted order and has design adaptations. The sheets 02 are preferably die-cut on the opposite side of the print image. This is why printing from beneath is the preferred embodiment.

The at least one application unit 600, preferably each application unit 600, preferably comprises at least one drive. The at least one application unit 600, preferably each application unit 600, preferably comprises at least one drive in the circumferential direction of the at least one plate cylinder 616 of the processing unit 600. The at least one drive in the circumferential direction of the at least one plate cylinder 616 of the processing unit 600, preferably of the plate cylinder 616 of the application unit 600, is preferably designed so as to accelerate and/or decelerate in each case the plate cylinder 616 of the processing unit 600, preferably the plate cylinder 616 of the application unit 600, in the circumferential direction. In addition or as an alternative, the at least one drive in the circumferential direction of the at least one plate cylinder 616 of the processing unit 600, preferably of the plate cylinder 616 of the application unit 600, is in each case designed to adapt a processing length of the processing unit 600, preferably a processing length of the plate cylinder 616, by accelerating and/or decelerating the plate cylinder 616 in the circumferential direction. The at least one drive in the circumferential direction of the at least one plate cylinder 616 of the processing unit 600 preferably in each case accelerates and/or decelerates the plate cylinder 616 of the processing unit 600 in the circumferential direction. In addition or as an alternative, the at least one drive in the circumferential direction of the at least one plate cylinder 616 of the processing unit 600 in each case preferably adapts a processing length of the processing unit 600 by accelerating and/or decelerating the plate cylinder 616 in the circumferential direction. The at least one plate cylinder 616 can preferably be accelerated and/or decelerated in the circumferential direction by means of the at least one drive, preferably a dedicated drive.

Preferably, the at least one plate cylinder 616 comprises at least one drive, preferably a dedicated drive, more preferably a closed loop position-controlled electric motor, for axially adjusting the plate cylinder 616. The at least one processing unit 600, which is preferably designed as an application unit 600, preferably comprises at least one drive for axially adjusting the at least one plate cylinder 616 of the processing unit 600. The at least one drive for axially adjusting the at least one plate cylinder 616 of the processing unit 600 is preferably designed so as to adjust in each case the plate cylinder 616 of the processing unit 600 axially, preferably in the transverse direction A. The at least one plate cylinder 616 is preferably axially adjustable. The at least one plate cylinder 616 of the at least one application unit 600 is preferably axially adjusted by means of the at least one drive for axially adjusting the plate cylinder 616. The axial adjustment is preferably carried out while the processing machine 01 is being set up for a new processing order. More preferably, the axial adjustment is carried out additionally or alternatively during the processing operation of substrate 02. For example, the axial adjustment is controlled manually by an operator. Preferably, as an alternative, the at least one drive of the plate cylinder 616, preferably at least the axial adjustment, is controlled by the at least one inspection device 726; 728; 916, preferably by the color register monitoring system 728.

The processing machine 01, for example, comprises at least one unit designed as a drying device, in particular a drying unit, which is more preferably designed as a module, in particular as a drying module. As an alternative or in addition, at least one drying device 506 and/or at least one after-drying device, for example, is a component of at least one unit 100; 300; 600; 700; 900; 1000 preferably designed as a module 100; 300; 600; 700; 900; 1000. For example, at least one application unit 600 comprises at least one drying device 506 and/or comprises at least one unit 700 designed as a transport device 700 and/or at least one unit designed as a transport unit 700.

The processing machine 01 comprises at least one transport device 700, which is designed as a unit 700, in particular the transport unit 700, and/or as a module 700, in particular as a transport module 700. The transport device 700 is also referred to as a transport means 700. In addition, or as an alternative, the processing machine 01 preferably comprises transport devices 700, for example as components of other units and/or modules. The at least one transport device 700 preferably comprises at least one drive, preferably a dedicated drive. The at least one transport unit 700 comprises the at least one transport element 701. The at least one transport unit 700 comprises a plurality of transport elements 701, which are arranged one behind the other in the transport direction T. For example, the transport unit 700 comprises at least one dedicated drive $M_E$ for axially adjusting at least one transport element 701 and/or at least one main drive M, for example at least one main drive M for driving, in the circumferential direction, preferably for rotationally, in particular rotatively, driving at least one transport element 701.

The processing machine 01 comprises at least one shaping device 900, which is designed as a unit 900, in particular as a shaping unit 900 or die-cutting unit 900, and/or as a module 900, in particular as a shaping module 900 or die-cutting module 900 and/or as a die-cutting device 900. A shaping unit 900 is one embodiment of a processing unit 900. The processing machine 01 preferably comprises at least one shaping unit 900 designed as a die-cutting unit 900. The at least one shaping device 900 is preferably designed as a rotary die-cutting device 900 and/or preferably comprises at least one shaping mechanism 914 or die-cutting mechanism 914, more preferably a rotary die cutting mechanism. A shaping device 900 shall also be understood to mean an embossing device and/or a creasing device. A perforating device is preferably likewise a form of a die-cutting device 900. Preferably, the at least one substrate 02, in particular sheet 02, is die-cut and/or creased and/or embossed and/or perforated in the at least one, preferably succeeding, processing unit 900, which is preferably designed as a shaping unit 900. The at least one die-cutting unit 900 preferably in each case comprises the at least one shaping mechanism 914 preferably designed as a die-cutting mechanism 914. The shaping mechanism 914 designed as a die-cutting mechanism 914 preferably comprises at least one plate cylinder 901 designed as a die-cutting cylinder 901. The plate cylinder 901 of the shaping unit 900 preferably comprises at least one drive assigned thereto, preferably a dedicated drive, and more preferably a closed loop position-controlled electric motor. The at least one shaping unit 900, preferably the processing unit 900 following the application unit 600, preferably comprises at least one drive in the circumferential direction of the at least one plate cylinder 901 of the processing unit 900. The at least one drive in the circumferential direction of the at least one plate cylinder 616; 901 of the processing unit 600; 900, preferably of the plate cylinder 901 of the die-cutting unit 900, is preferably designed so as to accelerate and/or decelerate in each case the plate cylinder 616; 901 of the processing unit 600; 900, preferably the plate cylinder 901 of the die-cutting unit 900, in the circumferential direction. In addition or as an alternative, the at least one drive in the circumferential direction of the at least one plate cylinder 616; 901 of the processing unit 600; 900, preferably of the plate cylinder 901 of the die-cutting unit 900, is in each case designed to adapt a processing length of the processing unit 600; 900, preferably a processing length of the plate cylinder 616; 901, by accelerating and/or decelerating the plate cylinder 616; 901 in the circumferential direction. The at least one drive in the circumferential direction of the at least one plate cylinder 901 of the processing unit 900 preferably in each case accelerates and/or decelerates the plate cylinder 901 of the processing unit 900 in the circumferential direction. In addition or as an alternative, the at least one drive in the circumferential direction of the at least one plate cylinder 901 of the processing unit 900 in each case preferably adapts a processing length of the processing unit 900 by accelerating and/or decelerating the plate cylinder 901 in the circumferential direction. The at least one plate cylinder 901 can preferably be accelerated and/or decelerated in the circumferential direction by means of the at least one drive, preferably a dedicated drive.

Preferably, the at least one plate cylinder 901 comprises at least one drive, preferably a dedicated drive, more preferably a closed loop position-controlled electric motor, for axially adjusting the plate cylinder 901. The at least one, preferably succeeding, processing unit 900, which is preferably designed as a die-cutting unit 900, preferably comprises at least one drive for axially adjusting the at least one plate cylinder 901 of the processing unit 900. The at least one drive for axially adjusting the at least one plate cylinder 901 of the processing unit 900 is preferably designed so as to adjust in each case the plate cylinder 901 of the processing unit 900 axially, preferably in the transverse direction A. The at least one plate cylinder 901 is preferably axially adjustable. The at least one plate cylinder 901 of the at least one shaping unit 900 is preferably axially adjusted by means of the at least one drive for axially adjusting the plate cylinder 901. The axial adjustment is preferably carried out while the processing machine 01 is being set up for a new processing order. More preferably, the axial adjustment is carried out additionally or alternatively during the processing operation of substrate 02. For example, the axial adjustment is controlled manually by an operator. For example, as an alternative, the axial adjustment is controlled by the at least one inspection device 726; 728; 916, preferably by the die-cutting monitoring system 916.

The at least one shaping unit 900, preferably the at least one succeeding processing unit 900, preferably comprises at least one drive of at least one anvil cylinder 902 of the processing unit 900. The at least one drive of the anvil cylinder 902 of the processing unit 900 is preferably designed to adapt a processing length of the processing unit 900 by accelerating and/or decelerating the anvil cylinder 902 in the circumferential direction. The at least one drive of the anvil cylinder 902 of the processing unit 900 preferably adapts a processing length of the processing unit 900 by accelerating and/or decelerating the anvil cylinder 902 in the circumferential direction. Preferably, the at least one plate cylinder 901 of the shaping device 900 is arranged in the vertical direction V above the at least one anvil cylinder 902. Advantageously, gravity is used in the processing operation to support the force application.

The sheet processing machine 01 is preferably characterized in that the at least one separation device 903 for removing at least one scrap piece from at least one sheet 02 is arranged after the at least one shaping point 910 along the transport path provided for the transport of sheets 02. The separation device 903 is preferably designed to entirely remove scrap pieces from the particular sheet 02. The at least one separation device 903 is thus used, in particular, to separate offcut pieces, in particular of the former portions of the sheet 02 that were already entirely or partially detached from the sheet 02 and are to be removed from the sheet 02, from multiple-ups, in particular those portions of the sheet 02 that are to continue to be treated as sheets 02 and, if necessary, to be further processed. The at least one separation device 903 is designed as a separation unit 903 and/or as a separation module 903, for example. As an alternative, the at least one separation device 903 is a component of another unit 900 or module 900, in particular of the at least one shaping unit 900 or shaping module 900.

The at least one separation device 903 preferably comprises at least one transport means 904 designed as a separation transport means 904, in particular for transporting sheets 02. The at least one separation transport means 904 is preferably used to transport respective sheets 02 along the transport path provided for the transport of sheets 02 and/or in the direction of transport T while scrap pieces are removed from the respective sheets 02. The scrap pieces are preferably transported in a respective direction that has at least one component which is oriented orthogonally to the transport direction T, preferably counter to a vertical direction V, for example vertically downwardly. Preferably, at least the force of gravity is also utilized to remove such scrap pieces from the particular sheet 02. In this way, it is preferably only necessary to apply a force that severs the respective scrap piece from the respective sheet 02, and the respective scrap piece is then carried away by gravity in a direction that has at least one component which is oriented orthogonally to the transport direction T, preferably downwardly.

The processing machine 01 preferably comprises at least one unit 1000 designed as a substrate output device 1000, in particular a delivery 1000, in particular a sheet delivery 1000, in particular a delivery unit 1000, which is more preferably designed as a module 1000, in particular as a delivery module 1000. The at least one substrate output device 1000 is preferably arranged in the transport direction T after the at least one shaping unit 900, more preferably after the at least one separation device 903, and more preferably subsequent to the at least one transport means 906. The substrate output device 1000 preferably comprises at least one delivery pile carrier 48 and at least one diverted delivery 51. The substrate output device 1000 designed as a delivery 1000 preferably comprises at least one sheet diverter 49, which can preferably be controlled by closed loop and/or open loop and which is designed to guide sheets 02 either to the delivery pile carrier 48 or the diverted delivery 51. Preferably the products, preferably products that can be further processed into end products, are deposited onto the at least one delivery pile carrier 48. Preferably, at least one sample sheet and/or sheet including wasted paper is deposited in the at least one diverted delivery 51. For example, the at least one sheet diverter 49 controls the transport path so that the processed sheet 02 is either deposited onto the delivery pile carrier 48 or in the diverted delivery 51.

The processing machine 01, for example, comprises at least one unit designed as a post-press processing device, in particular a post-press processing unit, which is more preferably designed as a module, in particular as a post-press processing module. The post-press processing unit is preferably arranged after the at least one shaping device 900 in the transport direction T. For example, the post-press processing unit is arranged after the at least one sheet delivery 1000 in the transport direction T. For example, the at least one post-press processing device is designed in each case as a gluing device and/or folding device.

The processing machine 01 preferably comprises transport means 700; 904; 906 at one or more points. The at least one transport unit 700 is preferably a transport means 700.

The at least one transport means 700; 904; 906 is preferably designed so as to move substrate 02, preferably sheets 02, more preferably individual sheets 02, preferably along the transport path through the processing machine 01. Preferably, in each case at least one transport means 700, preferably at least one suction transport means 700, is arranged at least between two consecutive processing units 600; 900. The at least one transport means 700; 904; 906 preferably comprises at least one transport element 701. Preferably, the at least one transport unit 700 designed as a transport means 700 comprises at least one, preferably at least two, more preferably at least three, more preferably at least four, more preferably at least five, transport elements 701. For example, the at least one transport unit 700 designed as a transport means 700 comprises no more than twenty, preferably no more than twelve, more preferably no more than eleven, transport elements 701. Preferably, the at least one transport element 701 is in contact with the substrate 02, at least if present. The at least one transport element 701 is preferably designed so as to move the substrate 02.

At least one of these transport means 700; 906 is preferably designed as a suction transport means 700; 906, in particular as a suction belt and/or as a suction box belt and/or as a roller suction system and/or as a suction roller. The at least one transport unit 700 is preferably designed as a suction transport means 700. Such suction transport means 700; 906 are preferably used to move substrate 02 forward in a controlled manner and/or to enable movements while the substrate 02 is held against at least one counterpressure surface of the corresponding suction transport means 700; 906. A relative vacuum is preferably used in the process to pull and/or to press the substrate 02, preferably the sheet 02, against at least one transport surface 702. A transporting movement of the substrates 02 is preferably produced by a corresponding, in particular revolving, movement of the at least one transport surface 702. As an alternative or in addition, the substrate 02 is held in the path thereof, for example along the transport path provided for the transport of substrate 02, by the at least one suction transport means 700; 906, and a transporting movement of the substrate 02 is produced in the process by a force that is predefined by another transport means 700; 904; 906 situated upstream and/or downstream, for example. The vacuum is in particular a vacuum relative to an ambient pressure, in particular relative to an atmospheric pressure. The suction transport means 700; 906 shall thus preferably be understood to mean a device that has at least one counterpressure surface, which more preferably is designed as a sliding surface and/or in particular as a movable transport surface 702, and which is at least partially movable, for example, at least in the transport direction T.

The respective suction transport means 700; 906 furthermore preferably comprises at least one vacuum chamber, which more preferably is connected to at least one vacuum source by means of a suction line. The vacuum source comprises a fan, for example. The at least one vacuum chamber has at least one suction opening 703, which is used to apply suction to the substrate 02. Depending on the embodiment of the suction transport means 700; 906 and the size of the substrate 02, the substrates 02 are drawn by suction into a position in which they close the at least one suction opening 703 or are merely drawn by suction against a transport surface 702 in such a way that ambient air can still travel past the substrate 02 and into the suction opening 703. The transport surface 702 has one or more intake openings, for example. The intake openings are preferably used to pass a vacuum from the suction opening 703 of the vacuum chamber to the transport surface 702, in particular without pressure losses or with very low pressure losses. As an alternative or in addition, the suction opening 703 acts on the substrate 02 to be transported in such a way that the same is drawn by suction against the transport surface 702, preferably without the transport surface 702 having any intake openings. At least one deflection means is provided, for example, which directly or indirectly ensures a revolving movement of the at least one transport surface 702. The at least one deflection means and/or the transport surface 702 preferably are self-propelled and/or can be self-propelled, in particular to ensure a movement of the substrate 02 in the transport direction T. Alternatively, the transport surface 702 allows substrate 02 to slide along the transport surface 702.

A first embodiment of a suction transport means 700; 906 is a suction belt. A suction belt shall be understood to mean a device that comprises at least one flexible transport belt, the surface of which serves as a transport surface 702. The at least one transport belt is preferably deflected by deflection means designed as deflection rollers and/or deflecting cylinders and/or is preferably self-contained, in particular such that continuous circulation is enabled. The at least one transport belt preferably has a multiplicity of intake openings. The at least one transport belt preferably covers the at least one suction opening 703 of the at least one vacuum chamber over at least a portion of its circulation path. More preferably, the vacuum chamber is then only connected to a surrounding environment and/or to substrate 02 by way of the intake openings of the at least one transport belt. Support means are preferably provided, which prevent the at least one transport belt from being pulled too far or at all into the vacuum chamber and/or which ensure that the transport surface 702 assumes a desired shape, for example such that it forms a flat surface, at least in the region in which the intake openings are connected to the vacuum chamber. A revolving movement of the at least one transport belt then results in a forward movement of the transport surface 702, with the substrate 02 being held securely on the transport surface 702 precisely in the region where it is situated opposite the suction opening 703 that is covered by the at least one transport belt, with the exception of the intake openings.

A second, preferred, embodiment of the transport means 700; 906, preferably of a suction transport means 700; 906, is a roller suction system. A roller suction system shall be understood to mean a device in which the at least one transport surface 702 is formed of at least sections of lateral surfaces of a multiplicity of transport elements 701, preferably of a multiplicity of transport rollers and/or transport cylinders. Thus, each of the transport elements 701, in particular the transport rollers and/or transport cylinders, forms a part of the transport surface 702 that is closed, for example, and/or that circulates as a result of rotation. The roller suction system preferably has a multiplicity of suction openings 703. These suction openings 703 are preferably arranged at least between adjacent transport elements 701, in particular transport rollers and/or transport cylinders. At least one covering mask is provided, for example, which preferably represents a boundary of the vacuum chamber. The covering mask preferably has the multiplicity of suction openings 703. The covering mask preferably forms a substantially flat surface. The transport elements 701, in particular the transport rollers and/or transport cylinders are preferably arranged so as to be intersected by this flat surface and more preferably so as to protrude only slightly, for example only a few millimeters, beyond this flat surface, in particular in a direction facing away from the vacuum chamber. The suction openings 703 then preferably have a frame-like design, with each opening surrounding at least one of the transport rollers and/or transport cylinders. A rotating movement in the circumferential direction preferably describes a revolving, preferably rotative movement. A revolving, preferably rotative, movement of the transport rollers and/or transport cylinders then results in a forward movement of the corresponding parts of the transport surface 702. In the process, substrate 02, preferably a sheet 02, is preferably held securely on the transport surface 702 exactly in the region where it is situated opposite the suction openings 703. Preferably, a line-shaped contact region of the substrate 02 with the at least one transport roller or transport cylinder is present in the region of the transport surface 702. The driving forces are preferably transferred from the at least one transport element 701 to the substrate 02 by friction fit. The transport unit 700 is preferably in each case designed as at least the one suction transport means 700 comprising the at least one roller suction system. For example, a suction transport means 700 comprises at least two roller suction systems, which are preferably each designed as individually driven roller suction systems. The roller suction system is preferably also referred to as a suction box. The movement of the at least one transport element 701 in the circumferential direction or in the transport direction T preferably describes a movement of a point on the lateral surface of the transport element 701 about the axis of rotation thereof, wherein a substrate 02, if present, is preferably moved by this movement in the transport direction T.

A third embodiment of a suction transport means 700; 906 is a suction box belt. A suction box belt shall be understood to mean a device that comprises a plurality of in particular circulating suction boxes, each of which has an outer surface that serves as a transport surface 702.

A fourth embodiment of a suction transport means 700; 906 is at least one suction roller. A suction roller shall be understood to mean a roller which has a lateral surface that serves as a transport surface 702 and has a multiplicity of intake openings, and which has at least one vacuum chamber in the interior thereof, which is connected to at least one vacuum source, for example by means of a suction line.

A fifth embodiment of a suction transport means 700; 906 is at least one sliding suction device. The sliding suction device is preferably designed as a passive transport means and is used, in particular, to establish boundary conditions with respect to a position of a respective substrate 02, without causing the substrate 02 itself to move. The respective sliding suction device preferably includes at least one sliding surface and at least one vacuum chamber and at least one suction opening. The at least one sliding surface then serves as a counterpressure surface and serves as a transport surface 702. In the case of the sliding suction device, the transport surface 702 designed as a sliding surface is preferably not moved. The sliding surface serves as a counterpressure surface against which the corresponding substrates 02 are pressed. The substrates 02 can nevertheless be moved along the sliding surface, in particular to the extent that they are acted upon otherwise by a force that is at least also oriented parallel to the sliding surface. A region between two driven suction transport means 700; 906 can be bridged by means of a sliding suction device, for example.

It is possible for different embodiments of suction transport means 700; 906 to be combined. These suction transport means can, for example, comprise at least one shared vacuum source and/or at least one shared vacuum chamber and/or at least and/or can cooperate as a suction transport means 700; 906 and/or can be arranged one behind the other and/or side by side. Each such combination is then preferably to be assigned to at least two of the embodiments of suction transport means 700; 906.

Regardless of the embodiment of the particular suction transport means 700; 906, at least two configurations of the particular suction transport means 700; 906 as described below are possible.

In a first, preferred arrangement, a section of the transport path provided for the transport of substrate 02 which is defined by the transport unit 700, and preferably the particular suction transport means 700; 906, is situated beneath the, preferably movable, transport surface 702 of the transport unit 700. The transport surface 702 is preferably used as a counterpressure surface and, for example, can be moved, at least partially, at least in the transport direction T. For example, the suction openings 703 or intake openings of the suction transport means 700; 906, at least while these are connected to the at least one vacuum chamber, are preferably at least also or only point downwardly and/or the suctioning action thereof is preferably at least also or only directed upwardly. The substrates 02 are then transported, preferably in a hanging state, by the suction transport means 700; 906.

In a second arrangement, a section of the transport path provided for the transport of substrate 02 which is defined by the transport unit 700, and preferably the particular suction transport means 700; 906, is situated above the, in particular movable, transport surface 702. The transport surface 702 is preferably used as a counterpressure surface and, for example, can be moved, at least partially, at least in the transport direction T. For example, the suction openings 703 or intake openings of the suction transport means 700; 906, at least while these are connected to the at least one vacuum chamber, are preferably at least also or only point upwardly and/or the suctioning action thereof is preferably at least also or only directed downwardly. The substrates 02 are then transported, preferably lying flat, by the suction transport means 700; 906.

At least one transport unit 700 of the processing machine 01 is arranged before at least one succeeding processing unit 600; 900 of the processing machine 01 in the transport direction T of substrate 02. In this way, in each case at least one transport unit 700 is preferably arranged upstream from a processing unit 600; 900, preferably at least the at least one application unit 600 and/or the at least one shaping unit 900. Preferably, at least one processing unit 600; 900 is arranged after a first transport unit 700 in the transport direction T. Preferably, at least one transport unit 700 is arranged upstream from the first processing unit 600; 900 in the transport direction T, in particular from a first application unit 600. The at least one application unit 600, including the at least one application mechanism 614 designed as a printing mechanism 614, is preferably arranged after the first transport unit 700 in the transport direction. The at least one application unit 600 is preferably designed so as to apply at least one print image onto the substrate 02. The at least one print image is preferably visible, for example colored. For example, in addition or as an alternative, at least one application unit 600 transfers at least one colorless print image, for example a varnish application, onto the at least one substrate 02. The at least one application unit 600 preferably in each case comprises the at least one printing unit 614 including the plate cylinder 616. The plate cylinder 616 preferably comprises a drive assigned thereto, preferably at least one dedicated drive, preferably at least one closed loop position-controlled electric motor. Preferably, the at least one application unit 600 comprises at least one drive for axially adjusting the at least one plate cylinder 616 of the at least one application unit 600 and/or at least one drive in the circumferential direction of the at least one plate cylinder 616 of the at least one application unit 600. The at least one application unit 600 is preferably embodied as a flexographic application unit 600 or as an offset printing unit 600. The processing machine 01 preferably comprises at least four application units 600, in particular flexographic application units 600. For example, the processing machine 01 comprises at least six, for example eight and/or no more than ten, application units 600, wherein the individual application units 600 preferably at least partially differ in the printing fluid they process and/or a print image element they apply onto the print substrate 02. Preferably, at least one respective transport means 700 is arranged in each case between two application units 600. In other words, at least one transport unit 700 is preferably arranged in each case between two consecutive processing machines 600; 900. The at least one printing mechanism 614 is preferably designed as a flexographic printing unit, which is in particular designed according to the principle of the flexographic printing method for applying printing fluid onto the sheet 02. In a preferred embodiment, the application mechanism 614 comprises the at least one plate cylinder 616, at least one impression cylinder 617, more preferably additionally at least one anilox roller 618 and at least one ink fountain 619. The ink fountain 619 preferably includes the printing fluid and is designed to dispense the printing fluid to the anilox roller 618. The anilox roller 618 is designed to transfer the printing fluid to at least one printing forme of the plate cylinder 616 for printing a print substrate 02. The plate cylinder 616 and the impression cylinder 617 preferably define a processing point 621 of the application mechanism 614.

The processing point 621, which is designed as a press nip 621 and through which sheets 02 can preferably pass through the printing mechanism 614, is preferably defined by an outer cylindrical surface of the plate cylinder 616 and an outer cylindrical surface of the impression cylinder 617. The press nip 621 is preferably the region in which the particular plate cylinder 616 on the one hand and the particular impression cylinder 617 on the other hand are closest to one another.

In a preferred embodiment of the processing machine 01, the printing mechanism 614 in each case comprises the at least one plate cylinder 616. The plate cylinder 616 comprises at least the one printing forme and at least one mount 626 for the at least one printing forme. The mount 626 of the printing forme is designed as a clamping device, for example. Along a circumferential direction of the outer cylindrical surface of the plate cylinder 616, the mount 626 of the printing forme is preferably designed as a non-printing region of the outer cylindrical surface of the plate cylinder 616. In the circumferential direction of the plate cylinder 616, the non-printing region of the plate cylinder 616 preferably has a length that is preferably at least 3%, preferably at least 5%, more preferably at least 8%, of the circumferential length of the plate cylinder 616. The length of the non-printing region is preferably defined by the length in the circumferential direction of the printing region of the plate cylinder 616, in particular the length of the at least one printing forme in the circumferential direction of the plate cylinder 616. In a preferred embodiment, the non-printing region corresponds to a cylinder channel of the at least one plate cylinder 616. Preferably, the at least one impression cylinder 617 comprises at least one mount 627.

In the non-printing region of the outer cylindrical surface of the plate cylinder 616, preferably no printing fluid is transferred from the outer cylindrical surface of the plate cylinder 616 onto sheets 02 during a printing operation of the processing machine 01. Printing fluid is preferably only transferred from the plate cylinder 616 onto sheets 02 within the region of the outer cylindrical surface of the plate cylinder 616 which includes the at least one printing forme. The region of the outer cylindrical surface of the plate cylinder 616 which includes the at least one printing forme is preferably designed as the printing region of the outer cylindrical surface of the plate cylinder 616. Preferably the at least one printing forme, more preferably exactly one printing forme, and the at least one non-printing region, preferably exactly one non-printing region, are arranged one behind the other along the circumferential direction of the outer cylindrical surface of the plate cylinder 616. In the direction of rotation of the plate cylinder 616, the mount 626 is preferably arranged before the printing region of the plate cylinder 616, more preferably a rear edge of the non-printing region of the plate cylinder 616 is arranged before the printing region of the plate cylinder 616 in the direction of rotation of the plate cylinder 616. A forward edge of the printing region of the plate cylinder 616 is preferably identical to the rear edge of the non-printing region of the plate cylinder 616.

For example, at least one first application unit 600, in the transport direction T, is designed as a priming mechanism and/or at least one last application unit 600, in the transport direction T, is designed as a varnishing mechanism.

In the transport direction T of substrate 02, at least one further processing unit 600; 900 follows the at least one processing unit 600 that is designed as an application unit 600. Preferably, at least one second application unit 600 follows, and preferably at least four further application units 600 follow, a first application unit 600. The at least one shaping device 900, preferably the at least one die-cutting unit 900, follows the at least one application unit 600, preferably the last application unit 600 of the application units 600. The at least one succeeding processing unit 600; 900 is thus preferably designed as an application unit 600, preferably comprising a flexographic printing unit, or as a die-cutting unit 900, preferably comprising a rotary die-cutting mechanism.

The at least one shaping device 900 including the at least one shaping mechanism 914 is arranged after the at least one application unit 600, preferably after the last application unit 600, in the transport direction T. The at least one shaping device 900 is preferably designed as a die-cutting device 900 and/or as a rotary die-cutting device 900. For example, exactly one shaping device 900, in particular die-cutting device 900 and/or rotary die-cutting device 900, is provided. The at least one shaping device 900 preferably comprises at least one, and more preferably exactly one, processing point 910 preferably designed as a shaping point 910, which is formed by at least one, and more preferably exactly one plate cylinder 901, in particular designed as a die cylinder 901, on the one hand, and at least one counterpressure cylinder 902, preferably an anvil cylinder 902, on the other hand. The shaping point 910 is preferably the region in which the particular plate cylinder 901 on the one hand and the particular counterpressure cylinder 902 on the other hand are closest to one another. The at least one shaping point 910 is preferably designed as at least one die-cutting point 910.

During die-cutting, the die-cutting cylinder 901 is preferably arranged in the die-cutting position. During a job change, the die-cutting cylinder 901 preferably remains in the die-cutting position thereof, or the die-cutting cylinder 901 is transferred into a backed-away position, preferably in the vertical direction V. During operation of the processing machine 01, at least one tool of the die-cutting cylinder 901, preferably the cutting blade thereof, in the die-cutting position preferably comes in contact with the die-cutting blanket of the anvil cylinder 902. This position of the anvil cylinder 902 is referred to as the die-cutting or working position of the anvil cylinder 902. During operation of the machine 01, the die-cutting cylinder 901 and the anvil cylinder 902 are arranged in the die-cutting position. Preferably, the anvil cylinder 902 comprises at least one drive, for example at least one servo drive. The anvil cylinder 902 is preferably arranged so as to be transferable from the die-cutting position into a backed-away position by means of the servo drive. In a preferred embodiment, the anvil cylinder 902 can be predominantly adjusted in the vertical direction V on a linear guide 953. The backed-away position is a position in which the anvil cylinder 902 is moved out of contact with the die-cutting cylinder 901. The anvil cylinder 902 thus preferably essentially remains in the die-cutting position thereof. The anvil cylinder 902 is preferably only backed away so far that the anvil cylinder 902 makes no contact. The servo drive preferably only backs the anvil cylinder 902 away between 15 and 30 cm. The servo drive preferably has a travel length of no more than 50 cm, and more preferably 30 cm. The die-cutting cylinder 901 and/or the anvil cylinder 902 preferably undergo maintenance, in particular the tool thereof is changed, when the anvil cylinder 902 is arranged in the backed-away position.

The shaping device 900, in particular the shaping mechanism 914, preferably comprises the at least one tool, and more preferably the at least one plate cylinder 901 comprises the at least one tool. In a preferred embodiment, the tool of the shaping device 900, in particular of the shaping mechanism 914, preferably the tool of the plate cylinder 901, is at least temporarily in direct contact with the counterpressure cylinder 902, in particular in the region of the shaping point 910. The at least one plate cylinder 901 is preferably designed as a die-cutting cylinder 901. The at least one tool of the plate cylinder 901 is preferably designed as a shaping tool, in particular die-cutting tool. The at least one plate cylinder 901 designed as a die-cutting cylinder 901 preferably comprises the at least one die-cutting tool, which preferably comprises at least one blade, and more preferably perpendicularly arranged blades. The blades are preferably discontinuously arranged and differ depending on the die-cutting job. The at least one counterpressure cylinder 902 designed as an anvil cylinder 902 preferably comprises a cover or die-cutting blanket. The die-cutting blanket is preferably made of a plastic material and/or rubber and has slightly elastic properties. The die-cutting blanket is preferably made of a plastic material such as polyurethane or the like. The die-cutting blanket, for example, can be easily pushed in and at least partially return to its shape.

The at least one plate cylinder 901 preferably has a tool length of the at least one tool thereof by way of which the at least one substrate 02 is processed. The plate length or tool length is between 450 mm and 1600 mm, for example. The at least one plate cylinder 901 designed, in particular, as a die-cutting cylinder 901 preferably comprises the at least one tool designed as a shaping tool, preferably as a die-cutting tool. The at least one tool preferably comprises at least one working surface. In a preferred embodiment, the at least one shaping tool is mounted on a mounting plate. A plate cylinder 901 of a shaping unit 900 preferably has several holes and/or bore holes, at which the mounting plate and/or the shaping tool can be directly mounted and/or preferably are mounted. The working surface of the shaping tool is preferably defined as a surface having a position that extends in the radial direction through the tool forms extending furthest to the outside. The shaping tool preferably comprises several processing elements, preferably die-cutting elements. Such die-cutting elements can, for example, be designed as cutting dies. A height of the die-cutting elements is preferably between 10 mm and 30 mm. Furthermore, the working surface preferably has a dimension in the circumferential direction. The working surface preferably extends in the circumferential direction of the plate 901 from a tool start to a tool end. The tool start is preferably defined by the start of elevations of processing elements and/or die-cutting elements and/or tool parts, in particular cutting dies, which are provided for processing a substrate 02. A working surface preferably represents between 30% and 90% of the outer cylindrical surface of the plate cylinder 901. Covering shall in particular be understood to mean the projection of the working surface directly onto the outer cylindrical surface in the radial direction. The working surface can preferably be subdivided into several sections having lengths in the circumferential direction. The working surface of the shaping tool preferably comprises several sections having working lengths for processing sections arranged one behind the other on a substrate 02. The number of sections depends on the number of processing sections of the job or the sections on a sheet 02. Accordingly, a section length of the working surface is assigned to each processing length of a section. The at least one plate cylinder 901 preferably has an inner radius between 175 mm and 300 mm. The radius, in particular the radius including the die-cutting elements, is preferably between 190 mm and 350 mm. A circumference of the plate cylinder 901 of the die-cutting mechanism 914, for example, also or alternatively of the plate cylinder 616 of the printing unit 614, is preferably 1600 mm±10%.

The surface of the at least one tool preferably has a curved design. Preferably, the at least one tool, which is preferably designed as a die-cutting tool, has a shell-like design, preferably a half-shell design. The inside diameter of the at least one tool is preferably adapted to the diameter of the surface of the at least one plate cylinder 901 so that the at least one plate cylinder 901 can preferably be fitted with the at least one tool. Preferably, at least two, for example at least three, tools are then arranged on the at least one die-cutting cylinder 901, in particular one behind the other in the circumferential direction of the die-cutting cylinder 901. Preferably, the at least two half-shell shaped tools have the same length in the circumferential direction. Preferably, all positions of the at least one die-cutting cylinder 901 which are intended for tools are fitted with a tool while substrate 02 is being processed.

The processing machine 01 preferably comprises several sensors 164; 622; 704; 722; 726; 728; 922; 916. These are preferably used to detect the substrate 02, preferably the arrival thereof and/or the substrate 02 itself, at certain points of the machine. Preferably, the at least one sensor 164; 622; 704; 722; 726; 728; 922; 916, and preferably all sensors 164; 622; 704; 722; 726; 728; 922; 916, can be displayed on at least one monitor and/or the function thereof can be monitored via the at least one monitor and/or the at least one sensor 164; 622; 704; 722; 726; 728; 922; 916 is controlled via at least one control console of the processing machine 01. At least one sensor 164; 622; 704; 722; 726; 728; 922; 916 of the sensors 164; 622; 704; 722; 726; 728; 922; 916 preferably has at least a data connection to at least one control unit. At least one sensor 164; 622; 704; 722; 726; 728; 922; 916 of the sensors 164; 622; 704; 722; 726; 728; 922; 916 is designed so as to ascertain data. Depending on the configuration of the sensor 164; 622; 704; 722; 726; 728; 922; 916, the data are, for example, image data, data establishing a relationship between a print image and an edge of the substrate 02, data regarding the positioning of the substrate 02, data regarding a positioning of at least one component of the processing machine 01 and/or data regarding a speed of at least one component of the processing machine 01. The ascertained data are preferably transmitted to at least one control unit and/or preferably saved therein. The ascertained data are preferably evaluated in the at least one control unit. At least one component of the processing machine 01, for example at least one transport element 701 and/or at least one plate cylinder 616; 901, is preferably activated or controlled based on the ascertained data.

Preferably, preferably depending on the function and/or position, preferably at least one sensor 704; 726; 728; 916 of the sensors 164; 622; 704; 722; 726; 728; 922; 916 is designed as an image acquisition device, preferably as a camera, more preferably as a color camera, more preferably as a line scan camera, more preferably as at least one CMOS sensor and/or at least one CCD sensor. A sensor 704; 726; 728; 916 designed as an image acquisition device preferably inspects the processing result of the substrate 02 and/or at least one section of the substrate 02. The sensor 704; 726; 728; 916 designed as an image acquisition device is preferably an inspection device 704; 726; 728; 916 for inspecting the substrate 02. Preferably, at least one lighting unit 727, for example a line scan lighting unit or a ring lighting unit, is assigned to the at least one sensor 704; 726; 728; 916 designed as an image acquisition device. Preferably, a sensor 704; 726; 728; 916 designed as an image acquisition device records at least one image of the substrate 02, preferably at least one image of the part of the substrate 02 that is located in the detection zone of the sensor 704; 726; 728; 916 during the detection. Preferably, the sensor 704; 726; 728; 916 designed as an image acquisition device sends a signal upon recognizing the passing substrate 02, preferably in the form of an image, to the at least one control unit of the processing machine 01. The control unit preferably evaluates the at least one signal, preferably the at least one image, and/or controls a component of the processing machine 01 based on the received signal. Preferably, the at least one transport unit 700 and/or preferably at least one transport element 701 of the at least one transport unit 700 is controlled by open loop and/or closed loop by way of at least one signal of the signals. The cylinders of the application units 600 and/or the cylinders of the shaping unit 900 are preferably controlled by open loop and/or closed loop by way of the signals. The processing machine 01 preferably comprises at least one sheet diverter 49 and/or at least one diverted delivery 51 for channeling substrate 02 out of the processing machine 01. If there are deviations in the print quality and/or the die-cutting quality, for example, the sheet diverter 49 is controlled by means of at least one signal of the sensors 726, 728, 916, and the substrate 02 deviating from the target state thereof is deflected in the transport path and preferably transported in this way into the diverted delivery 51.

The at least one application unit 600 is preferably designed so as to apply at least one print image onto the substrate 02. Preferably, at least one sensor 726 of the sensors 726; 728; 916 which are preferably designed as an image acquisition device is designed as a printed image monitoring system 726. Preferably, the substrate 02, preferably the at least one print image of the substrate 02, which more preferably was applied prior to inspection onto the substrate 02 by at least one application unit 600, is inspected by the image acquisition device designed as a printed image monitoring system 726. The printed image monitoring system 726 preferably inspects the substrate 02, preferably each passing substrate 02, for defects of the substrate 02 per se and/or for defects in the processing of the particular substrate 02 and/or for defects of the at least one print image of the particular substrate 02. Defects of the substrate 02 per se are, for example, surface deformations, such as holes or buckling of the surface, and/or the basic color of the substrate 02, for example the color of the substrate 02 without further fluid application during the processing operation in the processing machine 01. Defects of the print image encompass, in particular, missing and/or additional image-producing elements of at least one print image element and, additionally or alternatively, the color of the print image, in particular the ink quality, and/or of the respective print image elements and, additionally or alternatively, spatters of printing fluid, for example in undesirable locations.

The at least one inspection device 726 designed as a printed image monitoring system 726 is preferably arranged after the at least one application unit 600, preferably after the last application unit 600, and more preferably additionally before the at least one shaping unit 900. Preferably, the at least one printed image monitoring system 726 is connected, preferably in terms of the control, to the at least one sheet diverter 49 for channeling out substrate 02 and/or to at least one infeed of the substrate feed device 100 and/or to at least one marking device by means of the at least one control unit. If the deviation within a tolerance range of the controlled substrate 02, preferably at least the print image thereof, from a reference is minor, the operation of the processing machine 01 preferably continues. If a series defect exists, that is, a defect that occurs on several substrates 02 in a row, with respect to a deviation of the controlled substrate 02, preferably at least the print image thereof, from a reference, the infeed for feeding new substrates 02 to be processed into the processing machine 01 is preferably stopped. The substrate 02 is preferably either deposited on a delivery pile carrier 48 or channeled out onto an alternative transport path by means of at least one sheet diverter 49, based on the detection of the substrate 02 by the at least one printed image monitoring system 726. When the substrate 02 meets the target value, and in particular does not show any deviation from the target value within tolerance limits, the substrate 02 is preferably deposited onto the delivery pile carrier 48. Preferably, when the inspected substrate 02 deviates from the reference thereof, for example due to a defect of the substrate 02 per se and/or due to a defect in the processing operation and/or due to a defect of the print image, the substrate 02 is preferably channeled out, preferably by means of the control system of the at least one sheet diverter 49. For example, this substrate 02 is guided onto an alternative transport path and is preferably deposited onto a deposit pile in the diverted delivery 51. For example, in addition or as an alternative, the at least one printed image monitoring system 726 is connected to the at least one marking device, which is preferably arranged along the transport path after the printed image monitoring system 726, by means of the at least one control unit. If the inspected substrate 02 deviates from the reference thereof, the marking device preferably marks the substrate 02, for example at least one multiple-up copy of the substrate 02 deviating from the reference thereof. This preferably allows the substrate 02, preferably at least the multiple-up, to be separated later from further substrates 02 that correspond to the reference. The substrate 02 is thus preferably either deposited on a delivery pile carrier 48 or channeled out onto an alternative transport path by means of at least one sheet diverter 49 based on the detection of the substrate 02 by the at least one printed image monitoring system 726, and/or an infeed of a substrate feed device 100 is stopped and/or a marking device marks the substrate 02.

Preferably, in addition or as an alternative, at least one sensor 728 of the sensors 726; 728; 916, preferably designed as an image acquisition device, is designed as a color register monitoring system 728. The at least one inspection device 728 designed as a color register monitoring system 728 is preferably arranged after the at least one application unit 600, preferably after the last application unit, and more preferably additionally before the at least one shaping unit 900. The at least one color register monitoring system 728 preferably inspects register marks 16; 17; 18; 19; 21; 22; 23; 24 and/or at least one image-producing element of the substrate 02 for checking the color register and/or the perfecting register. In a preferred embodiment, the at least one color register monitoring system 728 inspects the register marks 16; 17; 18; 19; 21; 22; 23; 24, preferably for checking the color register and/or the perfecting register. For example, as an alternative or in addition to at least one register mark 16; 17; 18; 19; 21; 22; 23; 24, the at least one color register monitoring system 728 inspects at least one image-producing element of the substrate 02, for example at least one partial region of a print image which preferably differs from the surrounding area thereof in terms of the color and/or contrast, preferably for checking the color register and/or the perfecting register. Above and below, the term register mark 16; 17; 18; 19; 21; 22; 23; 24 shall be understood to mean a mark for checking the register and/or the color register. Preferably, at least one register mark 16; 17; 18; 19; 21; 22; 23; 24, preferably in each case at least two register marks 16; 17; 18; 19; 21; 22; 23; 24, more preferably in each case exactly two register marks 16; 17; 18; 19; 21; 22; 23; 24, are applied to at least one relevant sheet 02 for each application unit 600 and/or for each application mechanism 614, for example a first register mark 16; 17; 18; 19 and a second register mark 21; 22; 23; 24 per application mechanism 614. In accordance with DIN 16500-2, a register, for example in multicolor printing, exists when individual print image elements and/or image-producing elements and/or color segments are combined in precise alignment to form a single print image The register is also referred to as a color register. Circumferential registers, lateral registers and diagonal registers are preferably color registers with respect to certain spatial directions.

The register marks 16; 17; 18; 19; 21; 22; 23; 24, for example additionally or alternatively also the at least one image-producing element, are preferably compared to a reference. The reference is, for example, the target position thereof, referred to as a reference position 06; 07; 08; 09; 11; 12; 13; 14. Preferably, initially the at least one, for example two, register marks 16; 21, for example additionally or alternatively also the at least one image-producing element, of a first color, this being the color for register marks, are compared to the target position 06; 11 thereof. The color for register marks preferably corresponds to the application unit 600 having the greatest fluid application onto the substrate 02 during the present processing operation. The color for register marks is preferably a color rich in contrast, for example black or brown or blue. Preferably, the plate cylinder of the color for register marks is set up manually. The position of the color for register marks, preferably the definition of the target position thereof, is preferably aligned relative to the leading edge 03 of the substrate, for example additionally or alternatively relative to the processing of the at least one shaping unit 900. The further register marks 17; 18; 19; 21; 22; 23; 24, preferably additionally or alternatively also the at least one image-producing element, are preferably evaluated with respect to the position thereof relative to this at least one register mark 16; 21, that is, the register mark of the color for register marks. Preferably, the application units 600 are aligned with respect to one another, preferably the application units 600 are aligned with respect to the application unit 600 of the color for register marks, by means of the inspection of the register marks 16; 17; 18; 19; 21; 22; 23; 24, for example additionally or alternatively also the at least one image-producing element. Preferably, a plurality of substrates 02 are evaluated by means of the color register monitoring system 728, and the measurement results thereof are averaged. The application units 600 are preferably aligned based on the averaged measurement results, preferably for the succeeding substrates 02 that are to be processed.

The at least one color register monitoring system 728 is preferably connected to at least one drive by means of at least one control unit. Preferably, the at least one color register monitoring system 728 is connected by means of the at least one control unit to at least one drive for axially adjusting the at least one plate cylinder 616 of the at least one application unit 600 and/or to at least one adjusting device of the position of at least one printing forme of the plate cylinder 616 and/or to at least one drive in the circumferential direction of the at least one plate cylinder 616 of the at least one application unit 600. Preferably, the at least one drive for axially adjusting the at least one plate cylinder 616 of the at least one application unit 600 positions the plate cylinder 616 in the transverse direction A. Preferably, the at least one drive in the circumferential direction of the at least one plate cylinder 616 moves the plate cylinder in the circumferential direction, preferably in a rotating motion. Depending on the inspection by the at least one color register monitoring system 728, the at least one drive of at least one application unit 600 for axially positioning the plate cylinder 616 and/or at least one adjusting device of the position of at least one printing forme of the plate cylinder 616 and/or at least one drive moving the plate cylinder 616 in the circumferential direction is preferably activated by means of the at least one control unit.

A circumferential register preferably describes the alignment of the substrate 02 in the transport direction T. The circumferential register is preferably determined via the position of the register marks 16; 17; 18; 19; 21; 22; 23; 24 in the transport direction T, preferably along the direction Y from the trailing edge 04 to the leading edge 03 of the substrate 02, in particular by a distance ay in the direction Y, preferably by the color register monitoring system 728. In the event of a deviation of the circumferential register, a position in the circumferential direction of the at least one plate cylinder 616 creating the deviation is preferably rotated relative to the master axis value thereof. In this way, a new position of the plate cylinder 616 is preferably assigned to the master axis value. A lateral register preferably describes the alignment of the substrate 02 in the transverse direction A. The lateral register is preferably determined via the position of the register marks 16; 17; 18; 19; 21; 22; 23; 24 in the transverse direction A, preferably along the direction X from a side edge of the substrate 02 to the other side edge, in particular by a distance ax in the direction X, preferably by the color register monitoring system 728. Preferably, at least one, preferably each, plate cylinder 616 comprises at least one drive for laterally adjusting the plate cylinder 616. In the event of a deviation of the lateral register, the plate cylinder 616 creating the deviation is preferably axially adjusted relative to the plate cylinder 616 of the color for register marks. Preferably, the at least one drive adjusts the plate cylinder 616 axially, that is, in the transverse direction A, when a deviation of the lateral register of the relevant plate cylinder 616 is present. A diagonal register preferably describes a skewed position of the substrate 02. The diagonal register is preferably determined via the position of the forward register marks 16; 17; 18; 19 relative to the position of the rear register marks 21; 22; 23; 24 of the same color, in particular by a displacement angle w, preferably by the color register monitoring system 728. In the event of a deviation of the diagonal register, the printing forme of the plate cylinder 616 which created the deviation is preferably aligned. The alignment of the printing forme is preferably carried out by means of a displacement of the trailing edge relative to the leading edge of the printing forme, for example by lifting the printing forme off the plate cylinder 616 by means of blower air. Preferably, the color register monitoring system 728 additionally or alternatively inspects a printing length 12 of the substrate 02, preferably via the position and/or the distance of the forward register marks 16; 17; 18; 19 relative to the position and/or the distance of the rear register marks 21; 22; 23; 24 of the respective same application mechanism, preferably of the same color. The printing length of each color is preferably determined with respect to the printing length of the color for register marks. This actual printed printing length 12 is preferably compared to a reference length 11, the target distance of the register marks defined by the distance of the register marks of the color for register marks with respect to one another. In the event of a deviation of the processing length, preferably the printing length 12, that is, the time period at which the substrate 02 is being processed in the processing point 621 of the application unit 600, the plate cylinder 616 creating the deviation is preferably accelerated and/or decelerated while being in contact with a substrate 02 to be processed. The plate cylinder 616 preferably comprises at least one dedicated drive for this purpose, for adjusting the speed. Preferably, the print image generated by way of the particular plate cylinder 616 is thus stretched or compressed, and in particular adapted to the print image of the color for register marks. The printing length 12 is preferably corrected over the entire substrate 02. For example, in the case of a shortened actual value of the printing length 12 compared to the target value of the printing length 11, the speed of the plate cylinder 601 is increased, and the cylinder is operated at an increased speed compared to the master axis.

Over the revolution or the cycle of the plate cylinder 601, a gap arises in the region of the cylinder channel. Due to the changed speed, the phase position with respect to the master axis changes. However, the print image has to be applied with precision in the case of a plate cylinder 601, which is why the arrival time of the substrate 02 has to match precisely again. Accordingly, the plate cylinder 616 has to be decelerated and accelerated again in the gap so as to correct the phase position. In a preferred embodiment, the printing length 12 can also be adapted in sections.

Preferably, in addition or as an alternative, the at least one color register monitoring system 728 is connected, preferably in terms of the control, to the at least one dedicated drive $M_E$ and/or to the at least one main drive M by means of at least one control unit. Depending on the inspection by the at least one color register monitoring system 728, preferably the at least one dedicated drive $M_E$ for axially adjusting the at least one transport element 701 and/or the at least one main drive M for accelerating or for decelerating the at least one transport element 701 in the transport direction T are activated. For example, adjustment values for the axial adjustment of the at least one transport element 701, preferably of the axially adjustable transport elements 701, are defined by means of the at least one color register monitoring system 728 and are adopted for at least two, preferably at least ten, for example at least twenty, substrates 02. Preferably, these defined adjustment values form a basic adjustment, which are preferably added up for each substrate 02 with individual adjustment values, the individual adjustment values preferably being determined based on the individual recognition of the individual substrates 02 by the at least one sensor 704 assigned to the transport unit 700, and in particular to the at least one transport element 701, in particular by the at least one sensor 704 for substrate alignment.

For example, the printed image monitoring system 726 and the color register monitoring system 728 are a joint image acquisition device, for example, as an alternative, they are separate image acquisition devices. The printed image monitoring system 726 and/or the color register monitoring system 728 are preferably arranged after the last application unit 600 and before the at least one shaping unit 900. Preferably, no further alignment of the substrate 02 is carried out between the last application unit 600 and the printed image monitoring system 726 or the color register monitoring system 728.

Preferably, in addition or as an alternative, at least one sensor 916 of the sensors 726; 728; 916 preferably designed as an image acquisition device is designed as a die-cut pattern monitoring system 916. The at least one inspection device 916 designed as a die-cutting monitoring system 916 is preferably arranged after the at least one downstream processing unit 900 designed as a die-cutting unit 900. Preferably, the at least one die-cut pattern monitoring system 916 is arranged along the transport path after the at least one shaping unit 900, preferably after the last processing unit 600; 900 of the processing machine 01. The at least one die-cut pattern monitoring system 916 is preferably arranged before the delivery unit 1000. Preferably, the at least one die-cut pattern monitoring system 916 inspects the substrate 02 with respect to die-cut scraps or waste pieces and/or with respect to the die-cut contour and/or with respect to the position of the at least one print image relative to the position of the at least one die-cut pattern and/or with respect to the position of the at least one die-cut relative to the edges of the substrate 02 and/or with respect to the wear of the die-cutting tool and/or with respect to the wear of a cylinder cover of the anvil cylinder 902 and/or with respect to a change in the die-cutting length. The die-cutting examples used here can preferably be equally applied to creasing and/or embossing and/or further processing types of the shaping unit 900 corresponding to the particular configuration.

The at least one die-cutting monitoring system 916 is preferably connected, preferably in terms of the control, to the at least one sheet diverter 49 for channeling out substrate 02 and/or to at least one infeed of the substrate feed device 100 and/or to at least one output device creating a quality report and/or to at least one drive for axially adjusting the at least one plate cylinder 901 of the die-cutting unit 900 and/or to at least one drive in the circumferential direction of the at least one plate cylinder 901 of the die-cutting unit 900 and/or to at least one drive of the at least one anvil cylinder 902 of the die-cutting unit 900 and/or to the at least one dedicated drive $M_E$ and/or to the at least one main drive M by means of at least one control unit. The at least one die-cutting monitoring system 916 preferably controls at least one sheet diverter 49 for channeling out substrate 02 and/or at least one infeed of the substrate feed device 100 and/or at least one output device creating a quality report and/or the at least one drive for axially adjusting the at least one plate cylinder 901 of the die-cutting unit 900 and/or at least one drive in the circumferential direction of the at least one plate cylinder 901 of the die-cutting unit 900 and/or at least one drive of the at least one counterpressure cylinder 902 of the die-cutting unit 900 and/or the at least one dedicated drive $M_E$ of the transport unit 700 for substrate alignment and/or the at least one main drive M of the transport unit 700 for substrate alignment by means of at least one control unit, based on the detection of the substrate 02. Preferably in the case of a lateral offset of the plate cylinder 901 relative to the target position thereof, the plate cylinder 901 is preferably laterally adjusted so as to reach the target position. For the axial adjustment of the plate cylinder 901 of the shaping unit 900, the plate cylinder 901 preferably comprises at least one dedicated drive, and preferably a closed loop position-controlled electric motor. For example, the axial adjustment of the plate cylinder 910 of the shaping unit 900 is preferably carried out during the adjustment of the processing machine 01 after a job change. For example, in addition or as an alternative, the axial adjustment of the plate cylinder 901 is preferably in each case carried out for substrates 02 that follow the inspected substrate 02. This is done, for example, after a mean value has been created of the adjustment by the inspection of at least two, for example at least ten, substrates 02.

Preferably, a processing length, preferably the die-cutting length, that is, the time period at which the substrate 02 is being processed in the processing point 910 of the shaping unit 900, is adjusted by the relative speed of the anvil cylinder 902 with respect to the plate cylinder 901. Preferably, in the event of a deviation of the die-cutting length from the target length, the anvil cylinder 902, for example alternatively or additionally the plate cylinder 901, is accelerated and/or decelerated while in contact with at least one substrate 02. The anvil cylinder 902 preferably comprises a dedicated drive for this purpose, for adjusting the speed in the circumferential direction. For example, as an alternative or in addition, the plate cylinder 901 comprises a dedicated drive for adjusting the speed in the circumferential direction. Preferably, the die-cutting length is in each case adjusted for the substrates 02 that follow the inspected substrate 02. For setting the start of the processing operation of a substrate 02 in the processing point 910, the substrate 02 to be processed is preferably accelerated or decelerated by the transport unit 700 arranged upstream from the processing point 910, preferably so that the arrival time of the region of the substrate 02 to be processed coincides with the arrival time of the tool at the processing point 910. The start of the processing operation of a substrate 02 in the processing point 910 of the shaping device 900 is preferably set based on the detection of the substrate 02, preferably of the leading edge 03 thereof, by the at least one sensor 922 for recognizing the leading edge 03.

Preferably, preferably depending on the function and/or position, at least one sensor 164; 622; 704; 722; 922 of the sensors 164; 622; 704; 722; 726; 728; 922; 916 is designed as a light sensor, preferably comprising at least one photocell, for example as a photoelectric sensor and/or as a sensor for contrast recognition and/or as a transmitted light sensor.

Preferably, a sensor 164; 622; 704; 722; 922 that is preferably designed as a light sensor recognizes a substrate 02 passing along the transport path of the sensor 164; 622; 704; 722; 922, preferably an edge 03; 04, in particular a leading edge 03 and/or trailing edge 04, of the substrate 02 and/or at least one image-producing element of the substrate 02, preferably a printing mark and/or register mark 16; 17; 18; 19; 21; 22; 23; 24 and/or an element of a print image which can be distinguished from the surrounding area thereof. For example, the substrate 02 is recognized as a result of the difference in contrast with respect to the surrounding area of the object to be recognized, for example the edge 03; 04 or the image-producing element with respect to the surface of the substrate 02 surrounding the object. Preferably, the sheet arrival is recognized. Preferably, the sensor 164; 622; 704; 722; 922 designed as a light sensor sends a signal to a control unit of the processing machine 01 upon recognizing the passing substrate 02, in particular the object to be recognized.

At least one sensor 704 of the sensors 164; 622; 704; 722; 726; 728; 922; 916 is designed as a sensor 704 for substrate alignment. This sensor is preferably designed as a light sensor, and in particular as a sensor for contrast recognition. The at least one sensor 704 for substrate alignment recognizes at least one image-producing element, preferably a printing mark and/or register mark 16; 17; 18; 19; 21; 22; 23; 24 and/or an element of a print image of the substrate 02 which can be distinguished from the surrounding area thereof. The at least one sensor 704 for substrate alignment detects an image-producing element of the substrate 02. The at least one transport unit 700 for substrate alignment preferably comprises at least one sensor 704 for substrate alignment.

At least one sensor 164, which is preferably designed as a light sensor, preferably a sensor 164 of the sensors 164; 622; 704; 722; 726; 728; 922; 916, is preferably arranged in the substrate feed device 100. For example, the infeed device 300 comprises the at least one sensor 164 designed as a light sensor. Preferably, the at least one sensor 164 of the substrate feed device 100 which is preferably designed as a light sensor recognizes a passing substrate 02, preferably the leading edge 03 thereof and/or the trailing edge 02 thereof. Preferably, the time at which the substrate 02 is recognized is determined. The at least one sensor 164 of the substrate feed device 100 is preferably connected to at least one infeed of the substrate feed device 100 and/or to at least one drive of the processing machine 01. The at least one sensor 164 of the substrate feed device 100 preferably stops at least one infeed of the substrate feed device 100 and/or at least one drive of the processing machine 01 based on the detection of a substrate 02. If the deviation, preferably within a tolerance range, of the time of recognition from a reference value is minor, the substrate 02 is preferably guided to the processing units 600; 900 of the processing machine 01. In the event of a deviation, preferably outside a tolerance range, of the time of recognition from a reference value, the infeed of the substrate feed device 100 is preferably stopped and/or the processing of substrate 02 by the processing machine 01 is stopped.

For example, additionally or alternatively, is the sensor 164 of the substrate feed device 100, which is preferably designed as a light sensor, based on the transport direction T is arranged after at least one primary acceleration means, which pulls a substrate 02 from a pile from the storage area 166 thereof and/or accelerates the substrate 02 to a processing speed of the processing units 600; 900, and/or after at least one front stop, which preferably delimits the storage area 166, and/or before at least one secondary acceleration means, which preferably adapts the real transport speed of the substrate 02 by acceleration or deceleration to the processing speed of the processing units 600; 900, and/or in a region of the at least one secondary acceleration means. The at least one sensor 164 is preferably designed so as to control by closed loop and/or controls by closed loop a drive of the at least one acceleration means, preferably at least the secondary acceleration means, based on the detection of the substrate 02, in order to adapt the substrate 02 to the processing speed of the processing units 600; 900. Preferably, the real arrival time of the substrate 02 is determined from the detection of the substrate 02, preferably of the edge 03; 04 thereof and/or of at least one image-producing element, such as a printing mark, by the at least one sensor 164. The real arrival time is preferably compared to a reference, for example the target arrival time based on the machine cycle. Corresponding to the comparison, the at least one secondary acceleration means is preferably controlled by closed loop, preferably accelerated or decelerated, in order to adapt the substrate 02 to the processing speed.

At least one sensor 722, which is preferably designed as a light sensor, for recognizing a substrate 02 passing the sensor 722, preferably for recognizing the leading edge 03 of the substrate 02, preferably a sensor 722 of the sensors 164; 622; 704; 722; 726; 728; 922; 916, is preferably assigned to the at least one inspection device 726; 728; 916, preferably arranged upstream along the transport path, and more preferably arranged upstream without further units or devices being interposed. For example, at least one sensor 722 is assigned to the printed image monitoring system 726 and/or the color register monitoring system 728, preferably at least one sensor 722 for both systems. For example, at least one sensor 722 is assigned to the die-cutting monitoring system 916. The at least one inspection device 726; 728; 916 is preferably controllable by closed loop and/or open loop by the at least one signal of the at least one sensor 722 and/or is controlled thereby. The time for triggering at least one recording by the at least one inspection device 726; 728; 916 is preferably controllable by closed loop and/or open loop by the at least one signal of the at least one sensor 722 and/or is triggered thereby.

In each case at least one sensor 622; 922, which is preferably designed as a light sensor, for example a photoelectric sensor, preferably a sensor 622; 922 of the sensors 164; 622; 704; 722; 726; 728; 922; 916, is preferably assigned to a respective processing unit 600; 900, preferably application unit 600 or shaping unit 900, and preferably arranged before the processing point 621; 910 thereof. Preferably, at least one sensor 622; 922 for recognizing a leading edge 03 of a substrate 02 is in each case arranged before each processing unit 600; 900 of the processing machine 01. This at least one sensor 622; 922 is preferably designed to supply data for setting a start of the processing operation of a substrate 02 in a succeeding processing point 621; 910.

This at least one sensor 622; 922 is more preferably in each case connected to at least one main drive M of a transport unit 700 arranged before, preferably immediately before, the particular processing unit 600; 900 by means of at least one control unit. Based on the detection of the leading edge 03 of the substrate 02 by means of the at least one sensor 622; 922, at least one main drive M of a transport unit 700 arranged before the particular processing unit 600; 900 preferably accelerates and/or decelerates the at least one transport element 701 of this at least one transport unit 700. The arrival time of the substrate 02 at the processing point 621; 910 of the particular processing unit 600; 900 is thus preferably individually matched to the arrival time of the tool processing the substrate 02 at the processing point 621; 910, preferably for each processing unit 600; 900 of the processing machine 01, by way of an acceleration and/or a deceleration of the substrate 02.

The at least one sensor 622; 922 is preferably designed to recognize the leading edge 03 of the substrate 02 passing the sensor 622; 922. The at least one sensor 622; 922 for recognizing the leading edge 03 of the substrate 02 is preferably arranged at least before a last transport element 701 in the transport direction T, more preferably before the last two transport elements 701, more preferably the last three transport elements 701, more preferably the last four transport elements 701, of the at least one transport unit 700 before the at least one succeeding processing unit 600; 900. For example, two sensors 622; 922 are arranged parallel to one another, along the transport path, before the processing unit 600; 900, and preferably before the processing point 621; 910 thereof. Preferably, the at least one sensor 622; 922 that is preferably designed as a light sensor is arranged at the transport unit 700 arranged upstream from the processing point 621; 910, preferably without further units 100; 300; 600; 700; 900; 1000 being interposed. The particular sensor 622; 922 is preferably arranged in such a way that at least a portion of the transport device 700, in particular at least a portion of the relevant transport means 700, is arranged between the particular sensor 622; 922 and the relevant processing point 621; 909 of the relevant unit 600; 900. In a preferred embodiment of the transport device 700, the transport means 700 is designed as an upper suction transport means 700, in particular as the at least one roller suction system. Preferably, at least one transport roller and/or at least one transport cylinder, more preferably additionally no more than three transport rollers and/or three transport cylinders, of the upper suction transport means 700 are then arranged between the particular sensor 622; 922 and the processing point 621; 909 of the relevant unit 600; 900, based on the transport direction T. The sensor 622; 922 is in each case preferably arranged at the same coordinate, based on the transverse direction A. The sensors 622; 922 are preferably in each case arranged one behind the other in the transport direction T, preferably aligned with one another. An arrangement of the sensors 622; 922 in the transport direction T, in each case aligned with one another, preferably ensures that the same position of the leading edge 03 of the particular sheet 02 can be detected by the particular sensors 622; 922.

The at least one sensor 622; 922 for recognizing the leading edge 03 of the substrate 02 is preferably connected, preferably in terms of the control, to the at least one main drive M, preferably to at least one main drive M of the at least one transport unit 700 for substrate alignment, by means of at least one control unit. In the event of a correction of the color register in the transport direction T and/or in the event of a correction of the die-cutting register in the transport direction T, the arrival time of the at least one substrate 02 at the processing point 621; 910 of the processing unit 600; 900 assigned to the sensor 622; 922 is preferably adjusted relative to the arrival time of a starting region of a region of the plate cylinder 616; 901 of the processing unit 600; 900 processing the substrate 02 by means of the main drive M. Preferably, the at least one main drive M, corresponding to the detection of the substrate 02, preferably based on the detection of the leading edge 03 of the substrate 02, by means of the at least one sensor 622; 922 accelerates and/or decelerates the at least one transport element 701, preferably at least the last transport element 701 of the transport unit 700, which is preferably the last transport element 701 before the processing point 621; 910 along the transport path, more preferably the last two transport elements 701, more preferably the last three transport elements 701, more preferably the last four transport elements 701, more preferably all transport elements 701 of the transport unit 700. The arrival time of a region of the substrate 02 to be processed at the processing point 621; 910 is thus preferably set relative to the arrival time of the region of the plate cylinder 616; 901 processing the substrate 02, these preferably being matched to one another. As a result of the closed-loop control by means of the at least one sensor 622; 922 assigned to the particular processing unit 600; 900, the arrival time at the processing point 621; 910, preferably the position of the leading edge 03 of the substrate 02, in particular the assigned master axis value, preferably coincides with the arrival time, preferably with the position of the forward edge of the region of the plate cylinder 616; 901 to be printed, in particular the assigned master axis value.

At least one transport unit 700 of the processing machine 01 which is arranged before at least one processing unit 600; 900 of the processing machine 01 in the transport direction T of substrate 02 preferably feeds the substrate 02 to the succeeding processing unit 600; 900. At least one transport unit 700 is arranged between the at least one processing unit 600 that is designed as an application unit 600 and the at least one succeeding processing unit 600; 900. Hereafter, it preferably applies that these processing units 600; 900 are arranged one behind the other, without further processing units 600; 900 being interposed, along the transport path. For example, in the case that the succeeding processing unit 900 is designed as a shaping unit 900, preferably as a die-cutting unit 900, preferably at least two, for example four or five, transport units 700 are arranged, preferably immediately following one another, along the transport path between the processing unit 600; 900 designed as an application unit 600 and that designed as a shaping unit 900, preferably as a die-cutting unit 900.

The at least one transport unit 700 for aligning substrate 02 is arranged before at least one succeeding processing unit 600; 900, before at least one shaping unit 900 that is more preferably designed as a die-cutting unit 900. Preferably, the at least one transport unit 700 for aligning substrate 02 is, in particular, the at least two, or more preferably the at least three, transport units 700 for aligning substrate 02 are preferably part of an alignment section 750. The alignment section 750 is preferably arranged before at least one processing unit 600; 900 of the processing machine 01. Preferably, the at least one alignment section 750 comprises the at least one transport unit 700 for substrate alignment, preferably at least two transport units 700 arranged one behind the other in the transport direction T, preferably following one another, and more preferably at least three transport units 700 arranged one behind the other in the transport direction T. At least one transport unit 700 is formed between the processing unit 600 designed as an application unit 600 and the at least one succeeding processing unit 600; 900, the processing unit 900 designed as a shaping unit 900, for aligning substrate 02.

A section of the transport path provided for a transport of substrate 02, which is defined by the at least one transport unit 700, preferably at least the at least one transport unit 700 for substrate alignment, is preferably located beneath the transport surface 702 of the transport unit 700. The at least one transport unit 700 for substrate alignment preferably transports the at least one substrate 02 in a hanging state. In other words, the transport elements 701 of the at least one transport unit 700 are preferably located in the vertical direction V above the transport path of substrate 02. The transport path along the at least one transport unit 700 for substrate alignment is preferably exclusively arranged beneath the transport elements 701.

The at least one transport unit 700 for aligning substrate 02 is preferably arranged downstream from at least one transport unit 700 which comprises the at least one printed image monitoring system 726 and/or the at least one color register monitoring system 728. Preferably, first the color register and/or the printed image of the substrate 02 are monitored, and thereafter the substrate 02 is aligned along the transport path between the processing unit 600 preferably designed as an application unit 600 and the at least one succeeding processing unit 600; 900, preferably shaping unit 900.

The at least one transport unit 700, which is in particular arranged between the processing unit 600 designed as an application unit 600 and the at least one succeeding processing unit 600; 900, which is more preferably designed to align substrate 02, comprises the at least one transport element 701. The at least one transport unit 700, which is preferably designed to align substrate 02, comprises a plurality of transport elements 701. A plurality preferably describes a number greater than one, that is, at least two, preferably at least three, more preferably at least four, more preferably at least five. The at least one transport unit 700, which is preferably designed to align substrate 02, thus comprises at least two, preferably at least three, more preferably at least four, more preferably at least five, transport elements 701. For example, the at least one transport unit 700 comprises no more than twenty, preferably no more than twelve, preferably no more than eleven, transport elements 701. The transport elements 701 of the plurality of transport elements 701 are arranged one behind the other in the transport direction T and/or spaced apart from one another in the transport direction T. The at least one transport unit 700, which is preferably arranged between the processing unit 600 designed as an application unit 600 and the at least one succeeding processing unit 600; 900, which is more preferably designed to align substrate 02, is preferably designed as a suction transport means 700, preferably a roller suction system. In other words, the at least one transport unit 700, which is preferably designed to align substrate and which is arranged upstream from the at least one processing unit 600; 900, is thus preferably designed as a suction box. The at least one substrate 02 is preferably held in each case in a force-fit manner, preferably by suction air, during the transport thereof by the transport unit 700. The particular substrate 02 is preferably in each case imparted the transport speed thereof by transport elements 701 engaging thereon, preferably transport rollers or transport cylinders, of the transport unit 700. Preferably, the at least one transport element 701 forms, preferably all transport elements 701 that can be groupwise axially adjusted together form a transport section. In a preferred embodiment, the at least one transport unit 700 comprises at least two transport sections arranged one behind the other in the transport direction T.

The at least one transport element 701 is preferably in each case designed as an axis including at least one transport roller or transport cylinder. In other words, the at least one transport element 701 preferably comprises at least one transport roller or transport cylinder. In this way, the transport elements 701 of the plurality of transport elements 701 are preferably in each case designed as an axis including at least one transport roller or transport cylinder. The axis of the at least one transport roller or transport cylinder is preferably axially oriented, that is, directed in the transverse direction A. For example, the axis includes only one transport roller, which preferably shall also be understood to encompass cylinders. For example, as an alternative, the at least one transport element 701 is designed as at least one belt, preferably at least one suction belt. In a preferred embodiment, several transport rollers or transport cylinders, for example at least three, preferably at least four, are arranged along the axis, that is, in the transverse direction A. These are in each case spaced apart from one another, for example.

The at least one transport unit 700, which is preferably designed to align substrate 02, preferably comprises at least one main drive M. Preferably, each transport unit 700, which is designed to align substrate 02, comprises at least one main drive M. The at least one main drive M is preferably designed so as to generate the rotative, preferably revolving, movement of the at least one transport element 701. A rotative movement is preferably a movement rotating about a longitudinal axis. The rotative movement preferably describes the movement of the transport element 701 in the circumferential direction or in the transport direction T, that is, in particular, the rotation about the axis of rotation thereof. The at least one control unit is preferably provided, which activates or controls by closed loop the at least one main drive M. The at least one main drive M is preferably designed as a linear drive and/or an electric motor, preferably closed loop position-controlled. The at least one main drive M is preferably designed so as to generate a movement of the at least one transport element 701, which moves the at least one substrate 02 in the transport direction T. The substrate 02 is preferably moved in the transport direction T by means of a rotative movement, generated by the at least one main drive M, of the at least one transport element 701. Preferably, the at least one transport section is, more preferably all transport sections of the transport unit 700 are, connected to the at least one main drive M. As a result, the at least two transport elements 701 of the transport unit 700 are preferably connected to the at least one main drive M. Being connected to a drive preferably describes being drivable and/or driven by this drive. In a preferred embodiment, the plurality of transport elements 701 of the transport unit 700 are coupled to the at least one main drive M and/or are driven in the circumferential direction by way of the at least one main drive M. In other words, the main drive M thus generates the rotative movement of the at least one transport element 701, preferably all transport elements 701, of the plurality of transport elements 701. The plurality of transport elements 701 are preferably connected to one another via at least one gear train, preferably by means of at least one gear mechanism, preferably having straight teeth. The at least one main drive M is preferably designed so as to drive the gear train. Preferably, at least one gear wheel of a gear train is in each case arranged at the at least one transport element 701, in particular at the axis comprising the at least one transport roller or transport cylinder arranged thereon. The straight teeth preferably enable an axial adjustment of the gear wheels, thus advantageously an axial adjustment of the transport elements 701 arranged at the gear wheels, relative to one another. All transport elements 701 of the plurality of transport elements 701 are thus preferably coupled to the main drive M. All transport elements 701 of the plurality of transport elements 701 are preferably driven at the same speed in the transport direction T by the at least one main drive M. As a result, the at least two transport elements 701 arranged one behind the other in the transport direction T are preferably driven by the at least one main drive M, preferably at the same speed.

At least at least one transport element 701 of the at least one transport unit 700, which is preferably designed to align substrate 02, is axially adjustable. At least two transport elements 701 of the at least one transport unit 700, which is preferably designed to align substrate 02, are preferably axially adjustable. The at least one transport element 701, preferably the at least one axis comprising the at least one transport roller or transport cylinder arranged thereon, is axially adjustable. Axially adjustable preferably describes a change in position along the transverse direction A. In other words, axially adjustable preferably describes the change in position in the transverse direction A relative to a tool of a succeeding processing unit 600; 900. In the process, the transport element 701 is transferred along the transverse direction A from a first position into a second position having a different coordinate in the transverse direction A. In the process, the entire transport element 701 is preferably transferred along the transverse direction A from a first position into a second position having a different coordinate in the transverse direction A. The at least one transport element 701, in particular the at least one transport element 701 of the plurality of transport elements 701, is axially adjusted based on the detection of at least one image-producing element. The plurality of transport elements 701 are preferably individually axially adjustable or groupwise axially adjustable. In other words, it applies to the plurality of transport elements 701 that these are individually or groupwise axially adjustable or adjusted. As a result, preferably both a first transport element 701 of the plurality of transport elements 701 and the at least one further transport element 701 of the plurality of transport elements 701, that is, the at least two transport elements 701, are axially adjustable, wherein these are either groupwise axially adjustable together or individually axially adjustable. Individually preferably describes that each transport element 701 of the plurality of transport elements 701 is axially adjustable, preferably independently of further transport elements 701 of the plurality of transport elements 701. Groupwise preferably describes that at least two, preferably at least three, for example four, transport elements 701 of the plurality of transport elements 701 are axially adjustable together, that is, preferably with a simultaneous movement and/or by the same axial distance, preferably independently of further transport elements 701 of the plurality of transport elements 701. The groupwise adjustable transport elements 701 are preferably arranged one behind the other in the transport direction T and/or so as to be adjacent to one another, preferably without transport elements 701 that can be adjusted independently thereof being interposed.

The at least one transport element 701 preferably comprises a dedicated drive $M_E$ for the axial adjustment. The at least one transport element 701 of the plurality of transport elements 701 thus preferably comprises a dedicated drive $M_E$ for the axial adjustment. The at least one dedicated drive $M_E$ is preferably designed as a linear drive and/or an electric motor, preferably closed loop position-controlled. Preferably, the at least one dedicated drive $M_E$ is designed so as to adjust the at least one transport element 701 in the axial direction, preferably in or counter to the transverse direction A and/or orthogonally to the transport direction T in the plane of the transport path and/or in the direction of the working width. The at least one control unit is preferably provided, which activates or controls by closed loop the at least one dedicated drive $M_E$. The axial adjustment is preferably carried out independently of the position and/or the adjustment of further transport elements 701. In the case of the groupwise adjustment of the plurality of transport elements 701, the groupwise adjustable transport elements 701, which can be adjusted together, preferably comprise at least one dedicated drive $M_E$, that is, preferably a shared dedicated drive $M_E$. The at least one transport section is preferably connected to the at least one dedicated drive $M_E$. Preferably, each transport section comprises a dedicated drive $M_E$ of its own. In other words, the at least two transport elements 701 of the plurality of transport elements 701, which do not belong to a joint group, preferably in each case comprise a dedicated drive $M_E$ for the axial adjustment. The at least two transport elements 701 are thus preferably axially adjustable and/or are axially adjusted individually by at least one respective dedicated drive $M_E$ or groupwise by at least one dedicated drive $M_E$. As a result, preferably at least one transport element 701, preferably at least one transport section, of the transport unit 700 comprises at least two drives, these being the main drive M and the dedicated drive $M_E$.

The at least one transport unit 700, which is preferably designed to align substrate 02, preferably comprises the at least one transport element 701, for example also a first number of transport elements 701 that can be groupwise adjusted together, and at least one further transport element 701 arranged thereafter and/or therebefore in the transport direction T, for example also a second number of transport elements 701 that can be groupwise adjusted together. Each of these preferably comprises a dedicated drive $M_E$ for the axial adjustment. In other words, at least one further transport element 701 is arranged after the at least one axially adjustable transport element 701 and/or at least one further transport element 701 is arranged before the at least one axially adjustable transport element 701, which each comprise a dedicated drive $M_E$ for the axial adjustment. These transport elements 701 are thus preferably each axially adjustable. These at least two transport elements 701 thus preferably each comprise a dedicated drive $M_E$ for the axial adjustment. The at least one transport unit 700 preferably comprises the at least one transport element 701 and the at least one further transport element 701 arranged thereafter and/or therebefore in the transport direction T, which are each axially adjusted by means of a dedicated drive $M_E$. The dedicated $M_E$ of the at least one transport element 701, for example also of the first number of transport elements 701 that can be groupwise adjusted together, preferably adjusts the at least one transport element 701, for example also the first number of transport elements 701 that can be groupwise adjusted together, by a first component in the axial direction, preferably in or counter to the transverse direction A. The dedicated drive $M_E$ of the at least one further transport element 701, for example also of the second number of transport elements 701 that can be groupwise adjusted together, preferably adjusts this element by a second component in the axial direction, preferably in or counter to the transverse direction A. The two adjustments are preferably independent of one another. As a result, the first component and the second component thus differ from one another, for example, or are identical to one another, preferably depending on the requirement.

The processing machine 01 comprises the at least one sensor 704 for substrate alignment. The at least one transport element 701, for example the groupwise adjustable transport elements 701, of the at least one transport unit 700, which is preferably designed to align substrate 02, is axially adjustable based on the detection of at least one image-producing element of the substrate 02 by the at least one sensor 704 for substrate alignment. As a result, the at least one transport element 701 of the plurality of transport elements 701 is axially adjustable, or is axially adjusted, based on the detection of at least one image-producing element of a substrate 02 by the at least one sensor 704 for substrate alignment. The at least one transport element 701 is, in particular the at least two transport elements 701, more preferably the transport elements 701 of the plurality of transport elements 701, are axially adjusted based on the detection of at least one image-producing element of the substrate 02. More preferably, the plurality of transport elements 701 are individually axially adjusted or groupwise axially adjusted. Preferably, the at least one sensor 704 for substrate alignment, which is preferably connected to the at least one transport element 701, comprises at least one photocell. Preferably, at least two sensors 704 for substrate alignment are arranged one behind the other in the transverse direction A, which preferably each recognize the substrate 02. The two sensors 704 are preferably arranged parallel to one another along the transport direction T. Preferably, the at least one sensor 704 for substrate alignment is designed as a light sensor, preferably as a sensor 704 for contrast recognition. For example, as an alternative, the at least one sensor 704 for substrate alignment is designed as a camera. The at least one sensor 704 for substrate alignment preferably has at least one detection zone, which preferably covers a region of the transport path of substrate 02. The at least one sensor 704 for substrate alignment preferably recognizes a substrate 02 passing the sensor 704 for substrate alignment along the transport path.

Preferably, at least one sensor 622 recognizing a leading edge 03 of the substrate 02, for example a photoelectric sensor, is arranged upstream from the at least one sensor 704 for substrate alignment, which preferably provides the at least one sensor 704 for substrate alignment with a signal that the substrate 02 is entering the detection zone of the sensor 704 for substrate alignment.

The at least one sensor 704 for substrate alignment detects the at least one image-producing element of the substrate 02, and more preferably the at least one printing mark. For example, in addition or as an alternative to the at least one image-producing element, the at least one sensor 704 for substrate alignment preferably detects an edge 03; 04, in particular leading edge 03 and/or trailing edge 04 of the substrate 02 and/or register mark 16; 17; 18; 19; 21; 22; 23; 24 and/or an element of a print image that can be distinguished from the surrounding area thereof. In a preferred embodiment, the substrate 02, preferably the at least one image-producing element, more preferably the at least one printing mark, is recognized as a result of the difference in contrast with respect to the surrounding area of the object to be recognized, and in particular with respect to the surface of the substrate 02 surrounding the image-producing element.

The at least one sensor 704 for substrate alignment is preferably arranged between the at least one application unit 600 and the at least one succeeding processing unit 600; 900, preferably the die-cutting unit 900. Preferably, in addition or as an alternative, the at least one sensor 704 for substrate alignment, preferably for the detection of at least one image-producing element of the substrate 02, is assigned to, and preferably arranged at, the at least one transport unit 700, which is preferably designed to align substrate 02. The at least one sensor 704 for substrate alignment, based on which the at least one transport element 701 is axially adjusted and/or is axially adjustable, is preferably arranged between the at least one application unit 600 and the at least one succeeding processing unit 600; 900. For example, the at least one sensor 704 for substrate alignment is arranged after at least one first transport element 701, which is preferably axially adjustable, of the transport unit 700. In other words, the at least one sensor 704 for substrate alignment is, for example, arranged after at least one first transport element 701 of the transport unit 700. The at least one sensor 704 for substrate alignment is preferably arranged in the transport direction T before at least 75%, preferably before at least 80%, more preferably before at least 85%, of the transport elements 701 of the transport unit 700, which is preferably designed to align substrate 02, and preferably immediately therebefore, in particular without further transport means 700 being interposed.

Preferably, the at least one image-producing element, which the at least one sensor 704 for substrate alignment detects, based on which the at least one transport element 701 can be axially adjusted, is a printing mark. The detection of an image-producing element preferably allows the position of the substrate 02 in the transport direction T to be detected, preferably by way of the detection time. The at least one printing mark is preferably an element that is printed or can be printed by at least one application unit 600. For example, the substrate 02 already includes the at least one image-producing element when fed into the processing machine 01, for example, as an alternative, the at least one image-producing element is printed by at least one application unit 600 of the processing machine 01, preferably by the first application unit 600 of the processing machine 01 along the transport path. The substrate 02 preferably includes at least two, for example four, image-producing elements, preferably at least two printing marks, on the surface thereof. By using at least two image-producing elements, preferably by the detection thereof by means of the at least one sensor 704 for substrate alignment, the accuracy of the detection is preferably increased and/or the detection of a skewed position of the substrate 02 is made possible. The at least two image-producing elements are preferably arranged so as to be spaced apart axially, that is, in the transverse direction A, and/or in the direction X from one another. Preferably, the at least one image-producing element, preferably in each case the at least two image-producing elements, are arranged on the substrate 02 so as to be arranged in the at least one detection zone when passing a detection zone of the at least one sensor 704 for substrate alignment. Preferably, the substrate 02, preferably the sheet 02, includes the at least one image-producing element in the region of the leading edge 03, that is, spaced a shorter distance apart from the leading edge 03 than from the trailing edge 04, and/or preferably outside a region of the substrate 02 which forms an end product. The at least one image-producing element preferably has a varying length in the direction Y, that is, in the transport direction T, along the direction X, that is, preferably in the transverse direction A. The at least one image-producing element preferably includes a forward edge in the direction y, which corresponds to a line parallel to the direction X. Proceeding from the forward edge, the at least one image-producing element, preferably at a first position, preferably along the direction X, has a first length in the direction Y toward the trailing edge 04 of the substrate 02. At a second position along the direction X, the at least one image-producing element, preferably in the direction Y toward the trailing edge 04 of the substrate 02, has a second length, which differs from the first length of the first position, for example is longer or shorter. For example, the at least one image-producing element is trapezoidal or triangular. The at least two image-producing elements, which are preferably arranged parallel to one another in the direction X, are preferably mirror-symmetrical with respect to one another. Preferably, the at least one image-producing element is, preferably in each case the at least two image-producing elements are arranged on the substrate 02 so as to be arranged in the at least one detection zone when passing a detection zone of the at least one sensor 704 for substrate alignment, preferably based on which the at least one transport element 701 can be axially adjusted.

Preferably, the at least one image-producing element, preferably the at least one printing mark, is recognized by the at least one sensor 704 for substrate alignment. For example, the at least one sensor 704 for substrate alignment recognizes a difference in contrast that is present as soon as the at least one image-producing element enters the detection zone. The difference in contrast is likewise preferably recognized when the at least one image-producing element leaves the detection zone. Preferably, the duration of the detection of the at least one image-producing element in the detection zone is determined. Preferably, the arrival time of the substrate 02, and thus preferably the position in the transport direction T, is determined by the initial detection of the at least one image-producing element in the detection zone. As a result of the duration of the detection of the at least one image-producing element in the detection zone, preferably the axial position of the substrate 02, that is, a lateral offset of the substrate 02 relative to a target position, is determined. As a result of a detection of the at least two image-producing elements, which are preferably spaced apart from one another in the direction X, preferably a skewed position of the substrate 02 is determined. Preferably, the forward edge of the image-producing elements, and preferably the difference in contrast that occurs during the initial detection of the at least two image-producing elements in the at least one detection zone, is used for this purpose. Preferably, the at least two sensors 704 for substrate alignment are used for this purpose, which each detect one of the at least two image-producing elements. For example, as an alternative, the detection zone of the one sensor 704 for substrate alignment is designed so as to be able to detect both image-producing elements.

The at least one sensor 704 for substrate alignment is preferably connected, preferably in terms of the control, to the at least one dedicated drive $M_E$ by means of at least one control unit. The at least one sensor 704 for substrate alignment preferably controls by open loop and/or closed loop the at least one dedicated drive $M_E$ for the axial adjustment of the at least one transport element 701, and preferably the at least two dedicated drives $M_E$ for the axial adjustment of the at least two transport elements 701. The at least one transport element 701, for example also the groupwise adjustable number of transport elements 701, is axially adjusted based on the detection of the at least one image-producing element of the substrate 02, preferably so as to align the substrate 02 during the transport thereof.

Preferably when a lateral offset of the substrate 02, that is, a deviation from the target position in the transverse direction A, is established by the at least one sensor 704 for substrate alignment, which is preferably connected to the at least one transport element 701, the at least one transport element 701 is moved counter to the lateral offset, preferably in or counter to the transverse direction A. At least one transport element 701 of the at least one transport unit 700 is preferably axially adjusted until the lateral offset of the substrate 02 has been compensated for, that is, the actual position thereof corresponds to the target position. Preferably, for compensating for a lateral offset, the substrate 02, preferably the sheet 02, is transported in the transport direction T until both the leading edge 03 and the trailing edge 02 can be moved by transport elements 701 of this transport unit 700, preferably when no other transport elements 701 of further transport units 700 are contact with the substrate 02. In the process, preferably at least the transport elements 701 that are in contact with the substrate 02 are preferably arranged in a starting position. The at least one transport element 701 is, and preferably all transport elements 701 of the transport unit 700 that are in contact with the substrate 02 are, axially adjusted, preferably by means of the at least one dedicated drive $M_E$, more preferably in each case by means of the dedicated drive $M_E$ assigned to the particular transport element 701. As a result, preferably all transport elements 701 of the plurality of transport elements of the at least one transport unit 700 are axially adjusted when these, at the same time, are in contact with the substrate 02. For example, the transport elements 701 are adjusted groupwise or individually, in each case those transport elements 701 that are in contact with the substrate 02. In this way, the plurality of transport elements 701 are preferably individually axially adjusted based on the detection of the at least one image-producing element of the substrate 02, or the plurality of transport elements 701 are groupwise axially adjusted based on the detection of the at least one image-producing element of the substrate 02. All transport elements 701 that are being axially adjusted are adjusted in the same direction, that is, in or counter to the transverse direction A. The adjustment, for example, is carried out incrementally or continuously, in particular as long as contact exists between the transport element 701 and the substrate 02. Preferably, the at least one transport element 701 is axially adjusted and/or is maximally adjustable by no more than 25 mm (twenty-five millimeters), preferably by no more than 15 mm (fifteen millimeters), more preferably by no more than 10 mm (ten millimeters), more preferably by no more than 5 mm (five millimeters), more preferably by no more than 2.5 mm (two point five millimeters). Since the substrate 02 is simultaneously moved in the transport direction T, preferably by means of the revolving movement preferably generated by the at least one main drive M, a further transport element 701 makes contact with the substrate 02, while a first transport element 701, in the transport direction T, of the transport unit 700 is no longer in contact with the substrate 02. The transport element 701 that has now made contact is preferably likewise axially adjusted starting with the contact with the substrate 02. The transport element 701 that is no longer in contact is preferably axially adjusted in the opposite direction so as to return into the starting position. As a result, each further transport element 701 coming in contact is preferably axially adjusted, while each transport element 701 ending the contact is axially adjusted in the opposite direction into the starting position thereof. The substrate 02 preferably reaches the target position at least before the last transport element 701 of the transport unit 700. In particular, the substrate 02 is thus axially aligned by the axial adjustment of the at least one transport element 701, preferably of the transport elements 701 of the plurality of transport elements 701.

When a skewed position of the substrate 02 is established by the sensor 704 for substrate alignment, which is preferably connected to the at least one dedicated drive $M_E$ of the transport element 701, the skewed position of the substrate 02 is preferably compensated for by axially adjusting the at least one transport element 701. Preferably, for compensating for the skewed position, the substrate 02, preferably the sheet 02, is transported in the transport direction T until both the leading edge 03 and the trailing edge 02 can be moved by transport elements 701 of this transport unit 700, preferably when no other transport elements 701 of further transport units 700 are contact with the substrate 02. In the process, preferably at least the transport elements 701 that are in contact with the substrate 02 are preferably arranged in a starting position. Preferably, a turning point of the substrate 02 is stored in the machine control system, preferably in the control unit controlling the at least one dedicated drive $M_E$, for example calculated from the length and/or width of the substrate 02. The turning point is preferably the point about which the substrate 02 has to be turned to compensate for the skewed position. At least one transport element 701, which in the transport direction T is arranged before, that is, downstream from, the turning point, is preferably axially adjusted in or counter to the transverse direction A, preferably by means of the dedicated drive $M_E$ thereof. At least one transport element 701, which in the transport direction T is arranged after, that is, upstream from, the turning point, is preferably axially adjusted in the opposite direction with respect to the transport element 701 before the turning point, preferably by means of the dedicated drive $M_E$ thereof. The transport element 701, which corresponds to the position of the turning point, is preferably not axially adjusted, but remains in the axial position thereof assumed at this time. For example, the transport elements 701 are adjusted groupwise or individually, in each case those transport elements 701 that are in contact with the substrate 02. The adjustment, for example, is carried out incrementally or continuously, in particular as long as contact exists between the particular transport element 701 and the substrate 02. Preferably, the at least one transport element 701 is axially adjusted by no more than 15 mm (fifteen millimeters), preferably by no more than 10 mm (ten millimeters), more preferably by no more than 5 mm (five millimeters), more preferably by no more than 2.5 mm (two point five millimeters). Since the substrate 02 is simultaneously moved in the transport direction T, preferably by means of the revolving movement preferably generated by the at least one main drive M, a further transport element 701 makes contact with the substrate 02, while a first transport element 701, in the transport direction T, of the transport unit 700 is no longer in contact with the substrate 02. In addition, the turning point is moved in the transport direction T due to the movement of the substrate in the transport direction T. The transport element 701 that has now made contact is preferably likewise axially adjusted starting with the contact with the substrate 02, corresponding to the direction in which the transport elements 701 are adjusted before the turning point. The transport element 701 which now has the position of the turning point remains in the position thereof, while the transport element 701 that no longer has the turning point is likewise axially adjusted, corresponding to the direction of the transport elements 701 behind the turning point. The transport element 701 that is no longer arranged in contact with the substrate 02 is preferably axially adjusted so as to return into the starting position. As a result, each further transport element 701 coming in contact is preferably axially adjusted, while each transport element 701 ending the contact is axially adjusted into the starting position thereof. The substrate 02 preferably reaches the target position at least before the last transport element 701 of the transport unit 700. In particular, the substrate 02 is thus preferably aligned with respect to the skewed position thereof by the axial adjustment of the at least one transport element 701, preferably of the transport elements 701 of the plurality of transport elements 701.

In the event of a deviation of the substrate 02 from the target position in the transport direction T, established by the sensor 704 for substrate alignment, the substrate 02 is preferably aligned in the transport direction T. Preferably, in addition to the detection of the actual position in the transport direction T by the sensor 704 for substrate alignment, which is preferably connected to the at least one dedicated drive $M_E$ of the transport element 701, the substrate 02 that is preferably aligned with respect to a lateral offset and/or with respect to a skewed position is detected, while being transported by means of the at least one transport unit 700, by the at least one sensor 622; 922 assigned to the succeeding processing unit 600; 900, preferably by recognition of the leading edge 03. The arrival time is preferably determined by means of the initial detection of the leading edge 03 in the at least one detection zone of the at least one sensor 622; 922 and is compared to the target time thereof, that is, the target position of the substrate 02 at this time. In the event of a deviation, the at least one main drive M is preferably activated. The at least one main drive M preferably accelerates or decelerates the at least one transport element 701, preferably at least the transport elements 701 that are in contact with the substrate 02, more preferably all transport elements 701 of the transport unit 700, in accordance with the comparison. The substrate 02 is thus preferably accelerated or decelerated in the transport direction T and is thus transferred into the target position. In particular, the substrate 02 is thus aligned in the circumferential direction, that is, in the transport direction T, preferably by an acceleration and/or a deceleration of the transport elements 701 of the plurality of transport elements 701. The last transport element 701 of the transport unit 700 preferably only comprises the main drive M, that is, does not comprise a dedicated drive $M_E$. Preferably, the accuracy of the alignment of the substrate 02, in particular in the transport direction T, is increased by the two-stage alignment, that is, first the alignment with respect to lateral offset and/or a skewed position, and thereafter the alignment with respect to the transport direction T.

The alignment of the substrate 02 when laterally offset and the alignment of the substrate 02 when in a skewed position are preferably carried out simultaneously. For example, the alignment in the transport direction T is carried out simultaneously with the alignment of the substrate 02 when laterally offset and/or simultaneously with the alignment of the substrate 02 when in a skewed position. For a simultaneous adjustment, the adjustment values by means of the at least one dedicated drive $M_E$ are preferably superimposed. For example, as an alternative, the alignment in the transport direction T is carried out subsequent to the alignment of the substrate 02 when laterally offset and/or subsequent to the alignment of the substrate 02 when in a skewed position.

In a preferred embodiment, at least two, for example two, transport units 700 are arranged consecutively between the two processing units 600; 900, preferably between the at least one application unit 600 and the at least one die-cutting unit 900, which are both preferably designed so as to cooperate with one another for aligning substrate 02. These preferably align the substrate 02 in terms of the position thereof. The transport units 700 preferably each comprise at least one main drive M. The transport units are thus preferably each driven by means of at least one main drive M. Preferably, these at least two transport units 700 each comprise at least one transport element 701, preferably each comprise at least two transport elements 701. The transport elements 701 preferably each comprise a dedicated drive $M_E$. The first transport unit 700 of the two transport units 700 preferably comprises the at least one sensor 704 for substrate alignment, based on which the at least one transport element 701 of the first transport unit 700, and preferably additionally at least one transport element 701 of the second transport unit 700, are axially adjusted and/or adjustable. As a result, preferably at least one transport element 701 of the first transport unit 700 of the at least two transport units 700 is axially adjustable, and at least one transport element 701 of a second transport unit 700 of the at least two transport units 700 is axially adjustable. The second transport unit 700 preferably comprises at least one further sensor 704 for substrate alignment, which preferably checks an alignment of the substrate 02 that was carried out. Preferably, the last transport unit 700, which is arranged upstream from the die-cutting unit 900, comprises the at least one sensor 922 assigned to the die-cutting unit, preferably for recognizing the leading edge 03 of substrate 02. This last transport unit 700 is, for example, the second transport unit 700 for aligning substrate 02.

For example, at least one further sensor 704 for substrate alignment is, for example two sensors 704 for substrate alignment arranged one behind the other in the transverse direction A are, arranged along the transport path after the at least one first sensor 704 for substrate alignment, and before the succeeding processing unit 600; 900, preferably die-cutting unit 900. This at least one further sensor 704 for substrate alignment preferably checks the alignment of the substrate 02 as a result of the at least one first sensor 704 for substrate alignment. In this way, series defects in the alignment, that is, defects occurring in multiple substrates 02, can preferably be taken into consideration in the first sensor 704 for substrate alignment, preferably by superimposition with the further adjustment values. For example, at least one sensor 622 for recognizing the leading edge 03 of the substrate is arranged upstream from this at least one further sensor 704 for substrate alignment, preferably for triggering the signal that the substrate 02 is entering the detection zone of the at least one further sensor 704 for substrate alignment.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A processing machine (01) comprising: at least one processing unit (900) configured as a shaping unit (900) succeeding at least one processing unit (600) configured as an application unit (600) in a transport direction (T) of a substrate (02); at least one transport unit (700) being arranged between the at least one processing unit (600) configured as an application unit (600) and the at least one succeeding processing unit (900); the at least one transport unit (700) comprising a plurality of transport elements (701) configured to contact and transport the substrate (02); and the transport elements (701) of the plurality of transport elements (701) being arranged one behind another in the transport direction (T), characterized in that at least one transport element (701) of the plurality of transport elements (701) is axially adjustable based on detection of at least one image element on the substrate (02) by at least one sensor (704) for substrate alignment.

2. The processing machine according to claim 1, characterized in that a section, defined by the at least one transport unit (700), of a transport path provided for a transport of substrate (02) is located beneath a transport surface (702) of the transport unit (700) and/or that the at least one succeeding processing unit (900) is configured as a die-cutting unit (900) and/or that the processing machine (01) is configured as a rotary die-cutting machine (01) and/or that the at least one transport unit (700) is configured as a suction transport means (700) and/or that the at least one transport unit (700) is configured as a suction box.

3. The processing machine according to claim 1, characterized in that the at least one transport unit (700) comprises the at least one transport element (701) and at least one further transport element (701) arranged thereafter and/or therebefore in the transport direction (T), which are each axially adjustable, and/or that the plurality of transport elements (701) are individually axially adjustable or that the plurality of transport elements (701) are groupwise axially adjustable and/or that the at least one transport element (701) comprises a dedicated drive (ME) for the axial adjustment.

4. The processing machine according to claim 1, characterized in that the at least one sensor (704) for substrate alignment is arranged between the at least one application unit (600) and the at least one succeeding processing unit (900) and/or that the at least one sensor (704) for substrate alignment is arranged at the at least one transport unit (700) and/or that the at least one sensor (704) for substrate alignment is configured as a sensor for contrast recognition.

5. The processing machine according to claim 1, characterized in that the at least one sensor (704) for substrate alignment is arranged in the transport direction (T) before at least 75% of the transport elements (701) of the transport unit (700) and/or that the at least one sensor (704) for substrate alignment is arranged after at least one first transport element (701) of the transport unit (700).

6. The processing machine according to claim 1, characterized in that the at least one transport unit (700) comprises at least one main drive (M), which is configured so as to generate a rotative movement of the at least one transport element (701).

7. The processing machine according to claim 6, characterized in that the plurality of transport elements (701) are coupled to the at least one main drive (M) and/or that at least one sensor (622; 922) for recognizing a leading edge (03) of a substrate (02) is arranged at least before a last transport element (701), in the transport direction T, of the at least one transport unit (700) before the at least one succeeding processing unit (900) and the at least one sensor (622; 922) is connected to the at least one main drive (M) by means of at least one control unit.

8. The processing machine according to claim 6, characterized in that at least one sensor (622; 922) for recognizing a leading edge (03) of a substrate (02) is in each case arranged before each processing unit (600; 900) of the processing machine (01), and that the at least one sensor (622; 922) for recognizing a leading edge is in each case connected by means of at least one control unit to at least one main drive (M) of a transport unit (700) arranged before the particular processing unit (600; 900).

9. The processing machine according to claim 1, characterized in that at least two transport units (700) are arranged consecutively between the two processing units (600; 900), which are configured so as to cooperate with one another for aligning substrate (02).

10. A method for aligning a substrate (02) in a processing machine (01) comprising: at least one processing unit (900) configured as a shaping unit (900) succeeding at least one processing unit (600) configured as an application unit (600) in a transport direction (T) of substrate (02); at least one transport unit (700) being arranged between the at least one processing unit (600) configured as an application unit (600) and the at least one succeeding processing unit (900); the at least one transport unit (700) comprising a plurality of transport elements (701) configured to contact and transport the substrate (02); and the transport elements (701) of the plurality of transport elements (701) being arranged one behind the other in the transport direction (T), wherein the method comprises: adjusting at least one transport element (701) of the plurality of transport elements (701) axially based on a detection of at least one image element on the substrate (02) by at least one sensor (704) for substrate alignment.

11. The method according to claim 10, characterized in that a section, defined by the at least one transport unit (700), of a transport path provided for a transport of substrate (02) is located beneath a transport surface (702) of the transport unit (700) and/or that at least two transport units (700) are arranged consecutively between the two processing units (600; 900), which cooperate with one another for aligning the substrate (02).

12. The method according to claim 10, characterized in that the plurality of transport elements (701) are individually axially adjusted or that the plurality of transport elements (701) are groupwise axially adjusted and/or that the at least one sensor (704) for substrate alignment controls by open loop and/or closed loop at least one dedicated drive (ME) for axially adjusting the at least one transport element (701).

13. The method according to claim 10, characterized in that the at least one sensor (704) for substrate alignment is arranged between the at least one application unit (600) and the at least one succeeding processing unit (900) and/or that the at least one sensor (704) for substrate alignment is arranged at the at least one transport unit (700) and/or that the at least one sensor (704) for substrate alignment is arranged in the transport direction (T) before at least 75% of the transport elements (701) of the transport unit (700) and/or that the at least one sensor (704) for substrate alignment is arranged after at least one first transport element (701) of the transport unit (700) and/or that the at least one image element is recognized as a result of a difference in contrast with respect to a surrounding area of an object to be recognized.

14. The method according to claim 10, characterized in that the at least one transport unit (700) comprises at least one main drive (M), and that the substrate (02) is moved in the transport direction (T) by means of a rotative movement of the at least one transport element (701) generated by the at least one main drive (M).

15. The method according to claim 14, characterized in that all transport elements (701) of the plurality of transport elements (701) are driven at the same speed in the transport direction (T) by the at least one main drive (M) and/or that the plurality of transport elements (701) are coupled to the at least one main drive (M) and/or that, when a deviation of the substrate 02 from a target position in the transport direction (T) is established by the at least one sensor (704) for substrate alignment and/or by at least one sensor (622; 922) for recognizing a leading edge (03) of the substrate (02), the at least one main drive (M) accelerates or decelerates the at least one transport element (701) of the transport unit (700) in accordance with a comparison of an arrival time of the substrate (02) to the target position of the substrate (02) at the arrival time.

* * * * *